US009513898B2

(12) United States Patent
Solnit et al.

(10) Patent No.: US 9,513,898 B2
(45) Date of Patent: Dec. 6, 2016

(54) SYSTEMS AND METHODS FOR UPDATING SOFTWARE IN A HAZARD DETECTION SYSTEM

(71) Applicant: Google Inc., Mountain View, CA (US)

(72) Inventors: Jonathan Solnit, San Jose, CA (US); Kelly Veit, Mountain View, CA (US); Edwin H. Satterthwaite, Jr., Palo Alto, CA (US); Jeffrey Lee, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 239 days.

(21) Appl. No.: 14/319,308

(22) Filed: Jun. 30, 2014

(65) Prior Publication Data

US 2015/0378715 A1    Dec. 31, 2015

(51) Int. Cl.

| G06F 11/00 | (2006.01) |
|---|---|
| G06F 9/445 | (2006.01) |
| G06F 21/44 | (2013.01) |
| G09C 1/00 | (2006.01) |
| G06F 9/44 | (2006.01) |

(52) U.S. Cl.
CPC .............. *G06F 8/65* (2013.01); *G06F 21/44* (2013.01); *G09C 1/00* (2013.01); *G06F 9/4401* (2013.01)

(58) Field of Classification Search
CPC combination set(s) only.
See application file for complete search history.

(56) References Cited

U.S. PATENT DOCUMENTS

| 7,768,414 B2 * | 8/2010 | Abel ..................... G08B 21/14 128/903 |
|---|---|---|
| 8,035,320 B2 * | 10/2011 | Sibert ................ H05B 37/0245 315/149 |
| 8,627,127 B2 * | 1/2014 | Mucignat ........... G05D 23/1905 713/320 |
| 8,868,753 B2 * | 10/2014 | Luna ................... H04W 40/248 455/414.1 |
| 2007/0139183 A1 * | 6/2007 | Kates .................. G08B 25/005 340/521 |
| 2013/0120134 A1 * | 5/2013 | Hicks, III ........... G08B 25/004 340/501 |
| 2013/0311009 A1 | 11/2013 | McAndrew et al. |
| 2014/0068340 A1 | 3/2014 | Dayal et al. |
| 2014/0085092 A1 | 3/2014 | Fadell et al. |

(Continued)

*Primary Examiner* — Amine Riad
(74) *Attorney, Agent, or Firm* — Van Court & Aldridge LLP

(57) ABSTRACT

Systems and methods for updating software in a hazard detection system are described herein. Software updates may be received by, stored within, and executed by a hazard detection system, without disturbing the system's ability to monitor for alarm events and sound an alarm in response to a monitored hazard event. The software updates may be received as part of a periodic over-the-air communication with a remote server or as part of a physical connection with a data source such as a computer. The software updates may include several portions of code designed to operate with different processors and/or devices within the hazard detection system. The software updates may also include language specific audio files that can be accessed by the hazard detection system to play back language specific media files via a speaker.

36 Claims, 19 Drawing Sheets

(56) References Cited

U.S. PATENT DOCUMENTS

| | | |
|---|---|---|
| 2014/0096126 A1 | 4/2014 | Gourlay et al. |
| 2014/0191875 A1* | 7/2014 | Wedig .................. G08B 7/066 340/628 |
| 2014/0266669 A1* | 9/2014 | Fadell .................. G05B 19/042 340/501 |
| 2014/0320281 A1* | 10/2014 | Sager .................... H04Q 9/00 340/501 |
| 2015/0021993 A1 | 1/2015 | Smith et al. |
| 2015/0022349 A1 | 1/2015 | Smith et al. |
| 2015/0022367 A1 | 1/2015 | Matsuoka et al. |
| 2015/0029019 A1* | 1/2015 | Matsuoka ............ G08B 25/001 340/501 |
| 2015/0061859 A1* | 3/2015 | Matsuoka ............. G08B 27/00 340/501 |
| 2015/0070181 A1* | 3/2015 | Fadell ................... G08B 19/00 340/628 |
| 2015/0096876 A1* | 4/2015 | Mittleman ............. H01H 11/00 200/341 |
| 2015/0097684 A1* | 4/2015 | Sloo ...................... G01N 27/02 340/628 |
| 2015/0116106 A1* | 4/2015 | Fadell .................. G08B 19/005 340/501 |
| 2015/0116107 A1* | 4/2015 | Fadell .................. G08B 19/005 340/501 |
| 2015/0116108 A1* | 4/2015 | Fadell .................. G08B 19/005 340/501 |
| 2015/0116109 A1* | 4/2015 | Fadell .................. G08B 19/005 340/501 |
| 2015/0154850 A1* | 6/2015 | Fadell .................. G06Q 10/083 340/501 |

\* cited by examiner

SYSTEMS AND METHODS FOR UPDATING SOFTWARE IN A HAZARD DETECTION SYSTEM

TECHNICAL FIELD

This patent specification relates to systems and methods for updating software in a hazard detection system.

BACKGROUND

Hazard detection systems, such as smoke detectors, carbon monoxide detectors, combination smoke and carbon monoxide detectors, as well as systems for detecting other conditions have been used in residential, commercial, and industrial settings for safety and security considerations. Many hazard detection systems operate according to a set of standards defined by a governing body (e.g., Occupational Safety and Health Administration), or companies approved to perform safety testing (e.g., Underwriters Laboratories (UL)). For example, UL defines thresholds for when a smoke detector should sound an alarm and for when a carbon monoxide detector should sound an alarm. Similar thresholds are set forth for how the alarms are expressed to occupants (e.g., as shrieking or shrill audible sounds having certain minimum loudness metrics and repetition patterns). In addition to operating according to standards set by a governing body, some hazard detection systems may also operate according to a proprietary set of rules designed, for example, to enhance the performance of the system or provide an enhanced user experience. Since the standards, rules, and user preferences may evolve, it may be desirable to update hazard detection systems with software updates.

SUMMARY

Systems and methods for updating software in a hazard detection system are described herein. Software updates may be received by, stored within, and executed by a hazard detection system, without disturbing the system's ability to monitor for alarm events and sound an alarm in response to a monitored hazard event. The software updates may be received as part of a periodic over-the-air communication with a remote server or as part of a physical connection with a data source such as a computer. The software updates may include several portions of code designed to operate with different processors and/or electronic components within the hazard detection system. The software updates may also include language specific audio files that can be accessed by the hazard detection system to play back language specific media files via a speaker.

In one embodiment, a hazard detection system can include at least one hazard sensor, a non-volatile memory comprising a plurality of code images, wherein a first code image is active and a second code image is inactive. The system can include several processors each operative to run based on code stored in the active code image, the plurality of processors including at least a system processor and a safety processor. The system processor may be operative to manage a software update process to replace the inactive code image with an updated code image, and the safety processor may be operative to monitor the at least one hazard sensor for a hazard event while the system processor is managing the software update process.

In another embodiment, a method for updating software in a hazard detection system is provided. The hazard detection system can include system and safety processors, at least one sensor, and an alarm. The method can include performing a system status check to determine whether the system processor is permitted to execute a software update process, executing the software update process while the system status check is satisfied, ceasing the executing of the software update process if the system status check is not satisfied, and using the safety processor to monitor the at least one sensor and to activate the alarm in response to a monitored hazard event while the software update process is executing.

In another embodiment, a method for updating a language preference in a hazard detection system is provided. The hazard detection system can include at least one sensor, an alarm, and a speaker. The method can include receiving a software update image, which can include an audio kit that is accessed to play back media via the speaker, and code for a processor. The method can include authenticating the received software update image, rebooting the processor using the code in response to an authenticated received software update image, wherein the processor has access to the audio kit after it is successfully rebooted, and accessing the audio kit to playback media files via the speaker.

A further understanding of the nature and advantages of the embodiments discussed herein may be realized by reference to the remaining portions of the specification and the drawings.

DETAILED DESCRIPTION OF THE DISCLOSURE

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

It is to be appreciated that while one or more hazard detection embodiments are described further herein in the context of being used in a residential home, such as a single-family residential home, the scope of the present teachings is not so limited. More generally, hazard detection systems are applicable to a wide variety of enclosures such as, for example, duplexes, townhomes, multi-unit apartment buildings, hotels, retail stores, office buildings, and industrial buildings. Further, it is understood that while the terms user, customer, installer, homeowner, occupant, guest, tenant, landlord, repair person, and the like may be used to refer to the person or persons who are interacting with the hazard detector in the context of one or more scenarios described herein, these references are by no means to be considered as limiting the scope of the present teachings with respect to the person or persons who are performing such actions.

Figure 1:
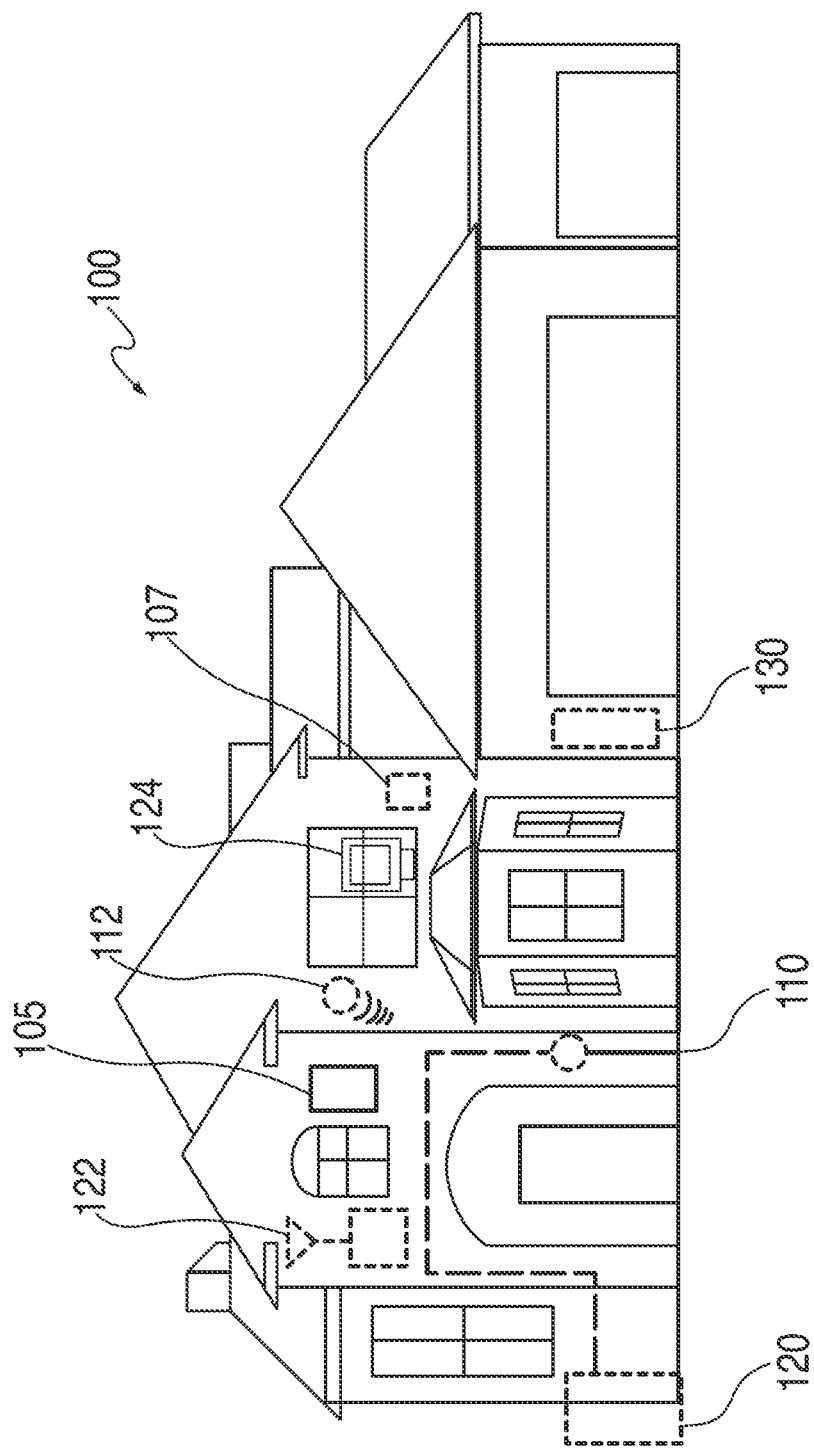
FIG. 1 is a diagram of an enclosure with a hazard detection system, according to some embodiments.

FIG. 1 is a diagram illustrating an exemplary enclosure 100 using hazard detection system 105, remote hazard detection system 107, thermostat 110, remote thermostat 112, heating, cooling, and ventilation (HVAC) system 120, router 122, computer 124, and central panel 130 in accordance with some embodiments. Enclosure 100 can be, for example, a single-family dwelling, a duplex, an apartment within an apartment building, a warehouse, or a commercial structure such as an office or retail store. Hazard detection system 105 can be battery powered, line powered, or line powered with a battery backup. Hazard detection system 105 can include one or more processors, multiple sensors, non-volatile storage, and other circuitry to provide desired safety monitoring and user interface features. Some user interface features may only be available in line powered embodiments due to physical limitations and power constraints. In addition, some features common to both line and battery powered embodiments may be implemented differently. Hazard detection system 105 can include the following components: low power wireless personal area network (6LoWPAN) circuitry, a system processor, a safety processor, non-volatile memory (e.g., Flash), WiFi circuitry, an ambient light sensor (ALS), a smoke sensor, a carbon monoxide (CO) sensor, a temperature sensor, a humidity sensor, a noise sensor, one or more ultrasonic sensors, a passive infra-red (PIR) sensor, a speaker, one or more light emitting diodes (LED's), and an alarm buzzer.

Hazard detection system 105 can monitor environmental conditions associated with enclosure 100 and alarm occupants when an environmental condition exceeds a predetermined threshold. The monitored conditions can include, for example, smoke, heat, humidity, carbon monoxide, carbon dioxide, radon, and other gasses. In addition to monitoring the safety of the environment, hazard detection system 105 can provide several user interface features not found in conventional alarm systems. These user interface features can include, for example, vocal alarms, voice setup instructions, cloud communications (e.g. push monitored data to the cloud, or push notifications to a mobile telephone, or receive software updates from the cloud), device-to-device communications (e.g., communicate with other hazard detection systems in the enclosure, including the communication of software updates between hazard detection systems), visual safety indicators (e.g., display of a green light indicates it is safe and display of a red light indicates danger), tactile and non-tactile input command processing, and software updates.

Hazard detection system 105 can implement multi-criteria state machines according to various embodiments described herein to provide advanced hazard detection and advanced user interface features such as pre-alarms. In addition, the multi-criteria state machines can manage alarming states and pre-alarming states and can include one or more sensor state machines that can control the alarming states and one or more system state machines that control the pre-alarming states. Each state machine can transition among any one of its states based on sensor data values, hush events, and transition conditions. The transition conditions can define how a state machine transitions from one state to another, and ultimately, how hazard detection system 105 operates. Hazard detection system 105 can use a dual processor arrangement to execute the multi-criteria state machines according to various embodiments. The dual processor arrangement may enable hazard detection system 105 to manage the alarming and pre-alarming states in a manner that uses minimal power while simultaneously providing relatively failsafe hazard detection and alarming functionalities. Additional details of the various embodiments of hazard detection system 105 are discussed below.

Enclosure 100 can include any number of hazard detection systems. For example, as shown, hazard detection system 107 is another hazard detection system, which may be similar to system 105. In one embodiment, both systems 105 and 107 can be battery powered systems. In another embodiment, system 105 may be line powered, and system 107 may be battery powered. Moreover, a hazard detection system can be installed outside of enclosure 100.

Thermostat 110 can be one of several thermostats that may control HVAC system 120. Thermostat 110 can be referred to as the "primary" thermostat because it may be electrically connected to actuate all or part of an HVAC system, by virtue of an electrical connection to HVAC control wires (e.g. W, G, Y, etc.) leading to HVAC system 120. Thermostat 110 can include one or more sensors to gather data from the environment associated with enclosure 100. For example, a sensor may be used to detect occupancy, temperature, light and other environmental conditions within enclosure 100. Remote thermostat 112 can be referred to as an "auxiliary" thermostat because it may not be electrically connected to actuate HVAC system 120, but it too may include one or more sensors to gather data from the environment associated with enclosure 100 and can transmit data to thermostat 110 via a wired or wireless link. For example, thermostat 112 can wirelessly communicate with and cooperates with thermostat 110 for improved control of HVAC system 120. Thermostat 112 can provide additional temperature data indicative of its location within enclosure 100, provide additional occupancy information, or provide another user interface for the user (e.g., to adjust a temperature setpoint).

Hazard detection systems 105 and 107 can communicate with thermostat 110 or thermostat 112 via a wired or wireless link. For example, hazard detection system 105 can wirelessly transmit its monitored data (e.g., temperature and occupancy detection data) to thermostat 110 so that it is provided with additional data to make better informed decisions in controlling HVAC system 120. Moreover, in some embodiments, data may be transmitted from one or more of thermostats 110 and 112 to one or more of hazard detections systems 105 and 107 via a wired or wireless link.

Central panel 130 can be part of a security system or other master control system of enclosure 100. For example, central panel 130 may be a security system that may monitor windows and doors for break-ins, and monitor data provided by motion sensors. In some embodiments, central panel 130 can also communicate with one or more of thermostats 110 and 112 and hazard detection systems 105 and 107. Central panel 130 may perform these communications via wired link, wireless link, or a combination thereof. For example, if smoke is detected by hazard detection system 105, central panel 130 can be alerted to the presence of smoke and make the appropriate notification, such as displaying an indicator that a particular zone within enclosure 100 is experiencing a hazard condition.

Enclosure 100 may further include a private network accessible both wirelessly and through wired connections and may also be referred to as a Local Area Network or LAN. Network devices on the private network can include hazard detection systems 105 and 107, thermostats 110 and 112, computer 124, and central panel 130. In one embodiment, the private network is implemented using router 122, which can provide routing, wireless access point functionality, firewall and multiple wired connection ports for connecting to various wired network devices, such as computer 124. Wireless communications between router 122 and networked devices can be performed using an 802.11 protocol. Router 122 can further provide network devices access to a public network, such as the Internet or the Cloud, through a cable-modem, DSL modem and an Internet service provider or provider of other public network services. Public networks like the Internet are sometimes referred to as a Wide-Area Network or WAN.

Access to the Internet, for example, may enable networked devices such as system 105 or thermostat 110 to communicate with a device or server remote to enclosure 100. The remote server or remote device can host an account management program that manages various networked devices contained within enclosure 100. For example, in the context of hazard detection systems according to embodiments discussed herein, system 105 can periodically upload data to the remote server via router 122. In addition, if a hazard event is detected, the remote server or remote device can be notified of the event after system 105 communicates the notice via router 122. Similarly, system 105 can receive data (e.g., commands or software updates) from the account management program via router 122.

Hazard detection system 105 can operate in one of several different power consumption modes. Each mode can be characterized by the features performed by system 105 and the configuration of system 105 to consume different amounts of power. Each power consumption mode corresponds to a quantity of power consumed by hazard detection system 105, and the quantity of power consumed can range from a lowest quantity to a highest quantity. One of the power consumption modes corresponds to the lowest quantity of power consumption, and another power consumption mode corresponds to the highest quantity of power consumption, and all other power consumption modes fall somewhere between the lowest and the highest quantities of power consumption. Examples of power consumption modes can include an Idle mode, a Log Update mode, a Software Update mode, an Alarm mode, a Pre-Alarm mode, a Hush mode, and a Night Light mode. These power consumption modes are merely illustrative and are not meant to be limiting. Additional or fewer power consumption modes may exist. Moreover, any definitional characterization of the different modes described herein is not meant to be all inclusive, but rather, is meant to provide a general context of each mode.

Although one or more states of the sensor state machines and system state machines may be implemented in one or more of the power consumption modes, the power consumption modes and states may be different. For example, the power consumption mode nomenclature is used in connection with various power budgeting systems and methods that are explained in more detail in United States Publication No. 2015/0022349 and United States Publication No. 2015/0021993.

Figure 2:
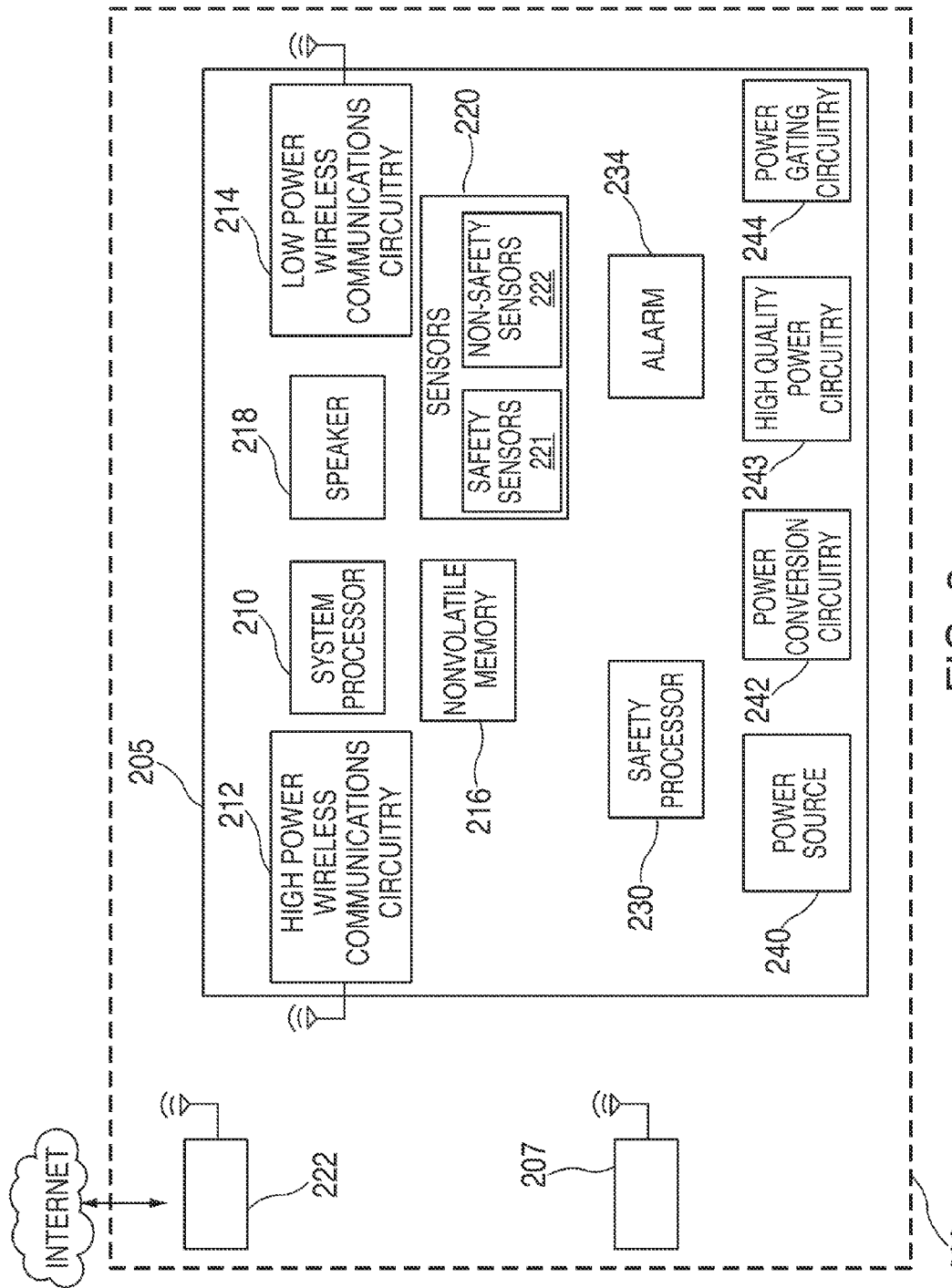
FIG. 2 shows an illustrative block diagram of a hazard detection system being used in an illustrative enclosure, according to some embodiments.

FIG. 2 shows an illustrative block diagram of hazard detection system 205 being used in an illustrative enclosure 200 in accordance with some embodiments. FIG. 2 also shows optional hazard detection system 207 and router 222. Hazard detection systems 205 and 207 can be similar to hazard detection systems 105 and 107 in FIG. 1, enclosure 200 can be similar to enclosure 100 in FIG. 1, and router 222 can be similar to router 122 in FIG. 1. Hazard detection system 205 can include several components, including system processor 210, high-power wireless communications circuitry 212 and antenna, low-power wireless communications circuitry 214 and antenna, non-volatile memory 216, speaker 218, sensors 220, which can include one or more safety sensors 221 and one or more non-safety sensors 222, safety processor 230, alarm 234, power source 240, power conversion circuitry 242, high quality power circuitry 243, and power gating circuitry 244. Hazard detection system 205 may be operative to provide failsafe safety detection features and user interface features using circuit topology and power budgeting methods that may minimize power consumption.

Hazard detection system 205 can use a bifurcated processor circuit topology for handling the features of system 205. Both system processor 210 and safety processor 230 can exist on the same circuit board within system 205, but perform different tasks. System processor 210 is a larger more capable processor that can consume more power than safety processor 230. That is, when both processors 210 and 230 are active, processor 210 consumes more power than processor 230. Similarly, when both processors are inactive, processor 210 may consume more power than processor 230. System processor 210 can be operative to process user interface features. For example, processor 210 can direct wireless data traffic on both high and low power wireless communications circuitries 212 and 214, access non-volatile memory 216, communicate with processor 230, and cause audio to be emitted from speaker 218. As another example, processor 210 can monitor data acquired by one or more sensors 220 to determine whether any actions need to be taken (e.g., shut off a blaring alarm in response to a user detected action to hush the alarm).

Safety processor 230 can be operative to handle safety related tasks of system 205, or other types of tasks that involve monitoring environmental conditions (such as temperature, humidity, smoke, carbon monoxide, movement, light intensity, etc.) exterior to the hazard detection system 205. Safety processor 230 can poll one or more of sensors 220 and activate alarm 234 when one or more of sensors 220 indicate a hazard event is detected. Processor 230 can operate independently of processor 210 and can activate alarm 234 regardless of what state processor 210 is in. For example, if processor 210 is performing an active function (e.g., performing a WiFi update) or is shut down due to power constraints, processor 230 can activate alarm 234 when a hazard event is detected. In some embodiments, the software running on processor 230 may be permanently fixed and may never be updated via a software or firmware update after system 205 leaves the factory. In other embodiments, processor 230 may be updated when system 205 is in the field.

Compared to processor 210, processor 230 is a less power consuming processor. Thus by using processor 230 in lieu of processor 210 to monitor a subset of sensors 220 yields a power savings. If processor 210 were to constantly monitor sensors 220, the power savings may not be realized. In addition to the power savings realized by using processor 230 for monitoring the subset of sensors 220, bifurcating the processors also ensures that the safety monitoring and core monitoring and alarming features of system 205 will operate regardless of whether processor 210 is functioning. By way of example and not by way of limitation, system processor 210 may comprise a relatively high-powered processor such as Freescale Semiconductor K60 Microcontroller, while safety processor 230 may comprise a relatively low-powered processor such as a Freescale Semiconductor KL15 Microcontroller. Overall operation of hazard detection system 205 entails a judiciously architected functional overlay of system processor 210 and safety processor 230, with system processor 210 performing selected higher-level, advanced functions that may not have been conventionally associated with hazard detection units (for example: more advanced user interface and communications functions; various computationally-intensive algorithms to sense patterns in user behavior or patterns in ambient conditions; algorithms for governing, for example, the brightness of an LED night light as a function of ambient brightness levels; algorithms for governing, for example, the sound level of an onboard speaker for home intercom functionality; algorithms for governing, for example, the issuance of voice commands to users; algorithms for uploading logged data to a central server; algorithms for establishing network membership; algorithms for facilitating updates to the programmed functionality of one or more elements of the hazard detection system 205 such as the safety processor 230, the high power wireless communications circuitry 212, the low power wireless communications circuitry 214, the system processor 210 itself, etc., and so forth), and with safety processor 230 performing the more basic functions that may have been more conventionally associated with hazard detection units (e.g., smoke and CO monitoring, actuation of shrieking/buzzer alarms upon alarm detection). By way of example and not by way of limitation, system processor 210 may consume on the order of 18 mW when it is in a relatively high-power active state and performing one or more of its assigned advanced functionalities, whereas safety processor 230 may only consume on the order of 0.05 mW when it is performing its basic monitoring functionalities. However, again by way of example and not by way of limitation, system processor 210 may consume only on the order of 0.005 mW when in a relatively low-power inactive state, and the advanced functions that it performs are judiciously selected and timed such that the system processor is in the relatively high power active state only about 0.05% of the time, and spends the rest of the time in the relatively low-power inactive state. Safety processor 230, while only requiring an average power draw of 0.05 mW when it is performing its basic monitoring functionalities, should of course be performing its basic monitoring functionalities 100% of the time. According to one or more embodiments, the judiciously architected functional overlay of system processor 210 and safety processor 230 is designed such that hazard detection system 205 can perform basic monitoring and shriek/buzzer alarming for hazard conditions even in the event that system processor 210 is inactivated or incapacitated, by virtue of the ongoing operation of safety processor 230. Therefore, while system processor 210 is configured and programmed to provide many different capabilities for making hazard detection unit 205 an appealing, desirable, updatable, easy-to-use, intelligent, network-connected sensing and communications node for enhancing the smart-home environment, its functionalities are advantageously provided in the sense of an overlay or adjunct to the core safety operations governed by safety processor 230, such that even in the event there are operational issues or problems with system processor 210 and its advanced functionalities, the underlying safety-related purpose and functionality of hazard detector 205 by virtue of the operation of safety processor 230 will continue on, with or without system processor 210 and its advanced functionalities.

High power wireless communications circuitry 212 can be, for example, a Wi-Fi module capable of communicating according to any of the 802.11 protocols. For example, circuitry 212 may be implemented using WiFi part number BCM43362, available from Murata. Depending on an operating mode of system 205, circuitry 212 can operate in a low power "sleep" state or a high power "active" state. For example, when system 205 is in an Idle mode, circuitry 212 can be in the "sleep" state. When system 205 is in a non-Idle mode such as a Wi-Fi update mode, software update mode, or alarm mode, circuitry 212 can be in an "active" state. For example, when system 205 is in an active alarm mode, high power circuitry 212 may communicate with router 222 so that a message can be sent to a remote server or device.

Low power wireless communications circuitry 214 can be a low power Wireless Personal Area Network (6LoWPAN) module or a ZigBee module capable of communicating according to an 802.15.4 protocol. For example, in one embodiment, circuitry 214 can be part number EM357 SoC available from Silicon Laboratories. Depending on the operating mode of system 205, circuitry 214 can operate in a relatively low power "listen" state or a relatively high power "transmit" state. When system 205 is in the Idle mode, WiFi update mode (which may require use of the high power communication circuitry 212), or software update mode, circuitry 214 can be in the "listen" state. When system 205 is in the Alarm mode, circuitry 214 can transmit data so that the low power wireless communications circuitry in system 207 can receive data indicating that system 205 is alarming. Thus, even though it is possible for high power wireless communications circuitry 212 to be used for listening for alarm events, it can be more power efficient to use low power circuitry 214 for this purpose. Power savings may be further realized when several hazard detection systems or other systems having low power circuitry 214 form an interconnected wireless network.

Power savings may also be realized because in order for low power circuitry 214 to continually listen for data transmitted from other low power circuitry, circuitry 214 may constantly be operating in its "listening" state. This state consumes power, and although it may consume more power than high power circuitry 212 operating in its sleep state, the power saved versus having to periodically activate high power circuitry 214 can be substantial. When high power circuitry 212 is in its active state and low power circuitry 214 is in its transmit state, high power circuitry 212 can consume substantially more power than low power circuitry 214.

In some embodiments, low power wireless communications circuitry 214 can be characterized by its relatively low power consumption and its ability to wirelessly communicate according to a first protocol characterized by relatively low data rates, and high power wireless communications circuitry 212 can be characterized by its relatively high power consumption and its ability to wirelessly communicate according to a second protocol characterized by relatively high data rates. The second protocol can have a much more complicated modulation than the first protocol.

In some embodiments, low power wireless communications circuitry 214 may be a mesh network compatible module that does not require an access point or a router in order to communicate to devices in a network. Mesh network compatibility can include provisions that enable mesh network compatible modules to keep track of other nearby mesh network compatible modules so that data can be passed through neighboring modules. Mesh network compatibility is essentially the hallmark of the 802.15.4 protocol. In contrast, high power wireless communications circuitry 212 is not a mesh network compatible module and requires an access point or router in order to communicate to devices in a network. Thus, if a first device having circuitry 212 wants to communicate data to another device having circuitry 212, the first device has to communicate with the router, which then transmits the data to the second device. In some embodiments, circuitry 212 can be used to communicate directly with another device that has circuitry 212.

Non-volatile memory 216 can be any suitable permanent memory storage such as, for example, NAND Flash, a hard disk drive, NOR, ROM, or phase change memory. In one embodiment, non-volatile memory 216 can store audio clips that can be played back by speaker 218. The audio clips can include installation instructions or warnings in one or more languages. Speaker 218 can be any suitable speaker operable to playback sounds or audio files. Speaker 218 can include an amplifier (not shown).

Sensors 220 can be monitored by safety processor 230 (and, in some embodiments, system processor 210), and can include safety sensors 221 and non-safety sensors 222. One or more of sensors 220 may be exclusively monitored by one of system processor 210 and safety processor 230. As defined herein, monitoring a sensor refers to a processor's ability to acquire data from that monitored sensor. That is, one particular processor may be responsible for acquiring sensor data, and possibly storing it in a sensor log, but once the data is acquired, it can be made available to another processor either in the form of logged data or real-time data. For example, in one embodiment, system processor 210 may monitor one of non-safety sensors 222, but safety processor 230 cannot monitor that same non-safety sensor. In another embodiment, safety processor 230 may monitor each of the safety sensors 221, but may provide the acquired sensor data (or some information indicative of the acquired sensor data) to system processor 210.

Safety sensors 221 can include sensors necessary for ensuring that hazard detection system 205 can monitor its environment for hazardous conditions and alert users when hazardous conditions are detected, and all other sensors not necessary for detecting a hazardous condition are non-safety sensors 222. In some embodiments, safety sensors 221 include only those sensors necessary for detecting a hazardous condition. For example, if the hazardous condition includes smoke and fire, then the safety sensors might only include a smoke sensor and at least one heat sensor. Other sensors, such as non-safety sensors, could be included as part of system 205, but might not be needed to detect smoke or fire. As another example, if the hazardous condition includes carbon monoxide, then the safety sensor might be a carbon monoxide sensor, and no other sensor might be needed to perform this task.

Thus, sensors deemed necessary can vary based on the functionality and features of hazard detection system 205. In one embodiment, hazard detection system 205 can be a combination smoke, fire, and carbon monoxide alarm system. In such an embodiment, detection system 205 can include the following safety sensors 221: a smoke detector, a carbon monoxide (CO) sensor, and one or more heat sensors. Smoke detectors can detect smoke and typically use optical detection, ionization, or air sampling techniques. A CO sensor can detect the presence of carbon monoxide gas, which, in the home, is typically generated by open flames, space heaters, water heaters, blocked chimneys, and automobiles. The material used in electrochemical CO sensors typically has a 5-7 year lifespan. Thus, after a 5-7 year period has expired, the CO sensor should be replaced. A heat sensor can be a thermistor, which is a type of resistor whose resistance varies based on temperature. Thermistors can include negative temperature coefficient (NTC) type thermistors or positive temperature coefficient (PTC) type thermistors. Furthermore, in this embodiment, detection system 205 can include the following non-safety sensors 222: a humidity sensor, an ambient light sensor, a push-button sensor, a passive infra-red (PIR) sensor, and one or more ultrasonic sensors. A temperature and humidity sensor can provide relatively accurate readings of temperature and relative humidity. An ambient light sensor (ALS) can detect ambient light and the push-button sensor can be a switch, for example, that detects a user's press of the switch. A PIR sensor can be used for various motion detection features. A PIR sensor can measure infrared light radiating from objects in its field of view. Ultrasonic sensors can be used to detect the presence of an object. Such sensors can generate high frequency sound waves and determine which wave(s) are received back by the sensor. Sensors 220 can be mounted to a printed circuit board (e.g., the same board that processors 210 and 230 may be mounted to), a flexible printed circuit board, a housing of system 205, or a combination thereof.

In some embodiments, data acquired from one or more non-safety sensors 222 can be acquired by the same processor used to acquire data from one or more safety sensors 221. For example, safety processor 230 may be operative to monitor both safety and non-safety sensors 221 and 222 for power savings reasons, as discussed above. Although safety processor 230 may not need any of the data acquired from non-safety sensor 222 to perform its hazard monitoring and alerting functions, the non-safety sensor data can be utilized to provide enhanced hazard system 205 functionality. The enhanced functionality can be realized in alarming algorithms according to various embodiments discussed herein. For example, the non-sensor data can be utilized by system processor 210 to implement system state machines that may interface with one or more sensor state machines, all of which are discussed in more detail below in connection with the description accompanying FIG. 3 and in United States Publication No. 2015/0022367.

Alarm 234 can be any suitable alarm that alerts users in the vicinity of system 205 of the presence of a hazard condition. Alarm 234 can also be activated during testing scenarios. Alarm 234 can be a piezo-electric buzzer, for example.

Power source 240 can supply power to enable operation of system 205 and can include any suitable source of energy. Embodiments discussed herein can include AC line powered, battery powered, a combination of AC line powered with a battery backup, and externally supplied DC power (e.g., USB supplied power). Embodiments that use AC line power, AC line power with battery backup, or externally supplied DC power may be subject to different power conservation constraints than battery only embodiments. Battery powered embodiments are designed to manage power consumption of its finite energy supply such that hazard detection system 205 operates for a minimum period of time. In some embodiments, the minimum period of time can be one (1) year, three (3) years, or seven (7) years. In other embodiments, the minimum period of time can be at least seven (7) years, eight (8) years, nine (9) years, or ten (10) years. Line powered embodiments are not as constrained because their energy supply is virtually unlimited. Line powered with battery backup embodiments may employ power conservation methods to prolong the life of the backup battery.

In battery only embodiments, power source 240 can include one or more batteries or a battery pack. The batteries can be constructed from different compositions (e.g., alkaline or lithium iron disulfide) and different end-user configurations (e.g., permanent, user replaceable, or non-user replaceable) can be used. In one embodiment, six cells of Li—FeS$_2$ can be arranged in two stacks of three. Such an arrangement can yield about 27000 mWh of total available power for system 205.

Power conversion circuitry 242 includes circuitry that converts power from one level to another. Multiple instances of power conversion circuitry 242 may be used to provide the different power levels needed for the components within system 205. One or more instances of power conversion circuitry 242 can be operative to convert a signal supplied by power source 240 to a different signal. Such instances of power conversion circuitry 242 can exist in the form of buck converters or boost converters. For example, alarm 234 may require a higher operating voltage than high power wireless communications circuitry 212, which may require a higher operating voltage than processor 210, such that all required voltages are different than the voltage supplied by power source 240. Thus, as can be appreciated in this example, at least three different instances of power conversion circuitry 242 are required.

High quality power circuitry 243 is operative to condition a signal supplied from a particular instance of power conversion circuitry 242 (e.g., a buck converter) to another signal. High quality power circuitry 243 may exist in the form of a low-dropout regulator. The low-dropout regulator may be able to provide a higher quality signal than that provided by power conversion circuitry 242. Thus, certain components may be provided with "higher" quality power than other components. For example, certain safety sensors 221 such as smoke detectors and CO sensors may require a relatively stable voltage in order to operate properly.

Power gating circuitry 244 can be used to selectively couple and de-couple components from a power bus. De-coupling a component from a power bus insures that the component does not incur any quiescent current loss, and therefore can extend battery life beyond that which it would be if the component were not so de-coupled from the power bus. Power gating circuitry 244 can be a switch such as, for example, a MOSFET transistor. Even though a component is de-coupled from a power bus and does not incur any current loss, power gating circuitry 244 itself may consume a finite amount of power. This finite power consumption, however, is less than the quiescent power loss of the component.

It is understood that although hazard detection system 205 is described as having two separate processors, system processor 210 and safety processor 230, which may provide certain advantages as described hereinabove and hereinbelow, including advantages with regard to power consumption as well as with regard to survivability of core safety monitoring and alarming in the event of advanced feature provision issues, it is not outside the scope of the present teachings for one or more of the various embodiments discussed herein to be executed by one processor or by more than two processors.

Figure 3:
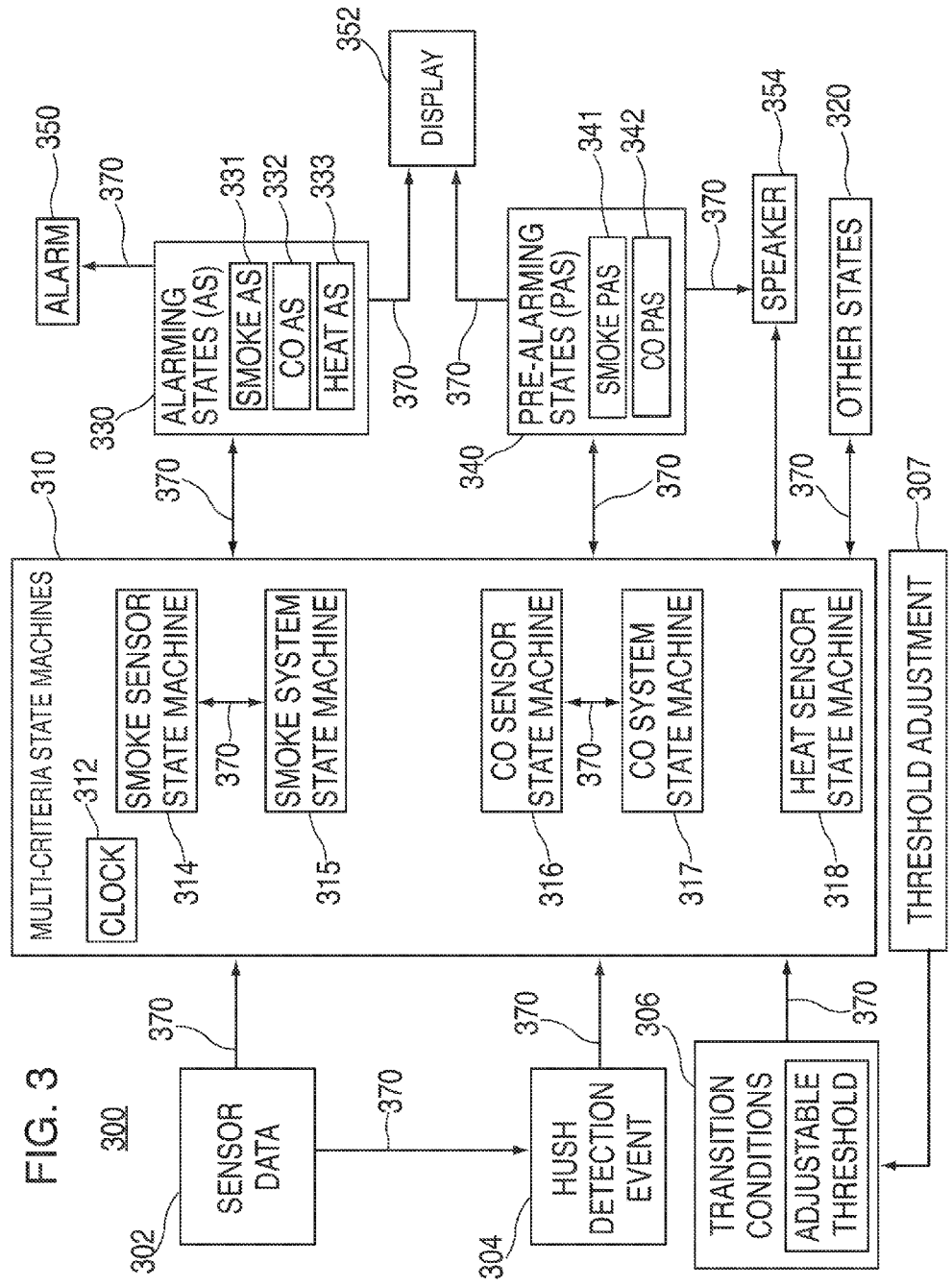
FIG. 3 shows an illustrative block diagram showing various components of a hazard detection system working together to provide multi-criteria alarming and pre-alarming functionality, according to some embodiments.

FIG. 3 shows an illustrative block diagram showing various components of hazard detection system 300 working together to provide multi-criteria alarming and pre-alarming functionalities according to various embodiments. As shown, system 300 can include sensor data 302, hush detection events 304, transition conditions 306, threshold adjustment parameter 307, multi-criteria state machines 310, clock 312, other states 320, alarming states 330, pre-alarming states 340, alarm 350, display 352, and speaker 354. Also shown are several communication links 370, each of which may have unidirectional or bidirectional data and/or signal communications capabilities. Multi-criteria state machines 310 can control alarming states 330, pre-alarming states 340, and all other state machine states 320 based on sensor data 302, hush detection events 304, transition conditions 306, clock 312, and other criteria, and alarming and pre-alarming states 330 and 340 can control the output of alarm 350, display 352, and speaker 354. Alarming states 330 can include multiple alarming states (e.g., one for each hazard, such as smoke alarming state 331, CO alarming state 332, and heat alarming state 333) and pre-alarming states 340 can include multiple pre-alarming states (e.g., one or more for each hazard, such as smoke pre-alarming state 341 and CO pre-alarming state 342. Other states can include, for example, idling states, monitoring states, alarm hushing states, pre-alarm hushing states, post-alarm states, holding states, and alarm monitoring states.

Alarming states 330 can control activation and deactivation of alarm 350 and display 352 in response to determinations made by multi-criteria state machines 310. Alarm 350 can provide audible cues (e.g., in the form of buzzer beeps) that a dangerous condition is present. Display 352 can provide a visual cue (e.g., such as flashing light or change in color) that a dangerous condition is present. If desired, alarming states 330 can control playback of messages over speaker 354 in conjunction with the audible and/or visual cues. For example, combined usage of alarm 350 and speaker 354 can repeat the following sequence: "BEEP, BEEP, BEEP—Smoke Detected In Bedroom—BEEP BEEP BEEP," where the "BEEPS" emanate from alarm 350 and "smoke detected in bedroom" emanates from speaker 354. As another example, usage of alarm 350 and speaker 354 can repeat the following sequence: "BEEP, BEEP, BEEP—Wave to Hush Alarm—BEEP BEEP BEEP," in which speaker 354 is used to provide alarming hush instructions. Any one of the alarming states 330 (e.g., smoke alarm state 331, CO alarm state 332, and heat alarm state 333) can independently control alarm 350 and/or display 352 and/or speaker 354. In some embodiments, alarming states 330 can cause alarm 350 or display 352 or speaker 354 to emit different cues based on which specific alarm state is active. For example, if a smoke alarm state is active, alarm 350 may emit a sound having a first characteristic, but if a CO alarm state is active, alarm 350 may emit a sound having a second characteristic. In other embodiments, alarming states 330 can cause alarm 350 and display 352 and speaker 354 to emit the same cue regardless of which specific alarm state is active.

Pre-alarming states 340 can control activation and deactivation of speaker 354 and display 352 in response to determinations made by multi-criteria state machines 310. Pre-alarming can serve as a warning that a dangerous condition may be imminent. Speaker 354 may be utilized to playback voice warnings that a dangerous condition may be imminent. Different pre-alarm messages may be played back over speaker 354 for each type of detected pre-alarm event. For example, if a smoke pre-alarm state is active, a smoke related message may be played back over speaker 354. If a CO pre-alarm state is active, a CO related message may be played back. Furthermore, different messages may be played back for each one of the multiple pre-alarms associated with each hazard (e.g., smoke and CO). For example, the smoke hazard may have two associated pre-alarms, one associated with a first smoke pre-alarming state (e.g., suggesting that an alarming state may be moderately imminent) and another one associated with a second smoke pre-alarming state (e.g., suggesting that an alarming state may be highly imminent). Pre-alarm messages may also include voice instructions on how to hush pre-alarm messages. Display 352 may also be utilized in a similar fashion to provide visual cues of an imminent alarming state. In some embodiments, the pre-alarm messages can specify the location of the pre-alarming conditions. For example, if hazard system 300 knows it is located in the bedroom, it can incorporate the location in the pre-alarm message: "Smoke Detected In Bedroom."

Hazard detection system 300 can enforce alarm and pre-alarm priorities depending on which conditions are present. For example, if elevated smoke and CO conditions exist at the same time, the smoke alarm state and/or pre-alarm smoke state may take precedence over the CO alarm state and/or CO pre-alarm state. If a user silences the smoke alarm or smoke pre-alarm, and the CO alarm state or CO pre-alarm state is still active, system 300 may provide an indication (e.g., a voice notification) that a CO alarm or pre-alarm has also been silenced. If a smoke condition ends and the CO alarm or pre-alarm is event is still active, the CO alarm or pre-alarm may be presented to the user.

Multi-criteria state machines 310 can transition to an idling state when it determines that relatively little or no dangerous conditions exist. The idling state can enforce a relatively low level of hazard detection system activity. For example, in the idle state, the data sampling rates of one or more sensors may be set at relatively slow intervals. Multi-criteria state machines 310 can transition to a monitoring state when it determines that sensor data values have risen to a level that warrants closer scrutiny, but not to a level that transitions to a pre-alarming or alarming state. The monitoring state can enforce a relatively high level of hazard detection system activity. For example, the data sampling rates of one or more sensors may be set at relatively fast intervals. In addition, the data sampling rates of one or more sensors may be set at relatively fast intervals for alarming states 330, pre-alarming states 340, or both.

Alarm hushing and pre-alarm hushing states may refer to a user-instructed deactivation of an alarm or a pre-alarm. For example, in one embodiment, a user can press a button (not shown) to silence an alarm or pre-alarm. In another embodiment, a user can perform a hush gesture in the presence of the hazard detection system. A hush gesture can be a user initiated action in which he or she performs a gesture (e.g., a wave motion) in the vicinity of system 300 with the intent to turn off or silence a blaring alarm. One or more ultrasonic sensors, a PIR sensor, or a combination thereof can be used to detect this gesture. The gesture hush feature and systems and methods for detecting and processing the gesture hush feature are discussed in more detail in United States Publication No. 2015/0029019.

Post-alarming states may refer to states that multi-criteria state machines 310 can transition to after having been in one of alarming states 330 or one of pre-alarming states 340. In one post-alarming state, hazard detection system 300 can provide an "all clear" message to indicate that the alarm or pre-alarm condition is no longer present. This can be especially useful, for example, for CO because humans cannot detect CO. Another post-alarming state can be a holding state, which can serve as a system debounce state. This state can prevent hazard detection system 300 from immediately transitioning back to a pre-alarming state 340 after having just transitioned from an alarming state 330.

Multi-criteria state machines 310 can include several different state machines: sensor state machines and system state machines. Each state machine can be associated with a particular hazard such as, for example, a smoke hazard, a carbon monoxide hazard, or a heat hazard, and the multi-criteria state machines may leverage data acquired by one or more sensors in managing detection of a hazard. In some embodiments, a sensor state machine can be implemented for each hazard. In other embodiments, a system state machine may be implemented for each hazard or a subset of hazards. The sensor state machines can be responsible for controlling relatively basic hazard detection system functions and the system state machines can be responsible for controlling relatively advanced hazard detection system functions. In managing detection of a hazard, each sensor state machine and each system state machine can transition among any one of its states based on sensor data 302, hush events 304, and transition conditions 306. A hush event can be a user initiated command to hush, for example, a sounding alarm or pre-alarm voice instruction.

Transition conditions 306 can include a myriad of different conditions that may define how a state machine transitions from one state to another. Each state machine can have its own set of transition conditions, and examples of state machine specific transition conditions can be found in United States Publication No. 2015/0022367. The conditions can define thresholds that may be compared against any one or more of the following inputs: sensor data values, time clocks, and user interaction events (e.g., hush events). State change transitions can be governed by relatively simple conditions (e.g., single-criteria conditions), or relatively complex conditions (e.g., multi-criteria conditions). Single-criteria conditions may compare one input to one threshold. For example, a simple condition can be a comparison between a sensor data value and a threshold. If the sensor data value equals or exceeds the threshold, the state change transition may be executed. In contrast, a multi-criteria condition can be a comparison of one or more inputs to one or more thresholds. For example, a multi-criteria condition can be a comparison between a first sensor value and a first threshold and a comparison between a second sensor value and a second threshold. In some embodiments, both comparisons would need to be satisfied in order to effect a state change transition. In other embodiments, only one of the comparisons would need to be satisfied in order to effect a state change transition. As another example, a multi-criteria condition can be a comparison between a time clock and a time threshold and a comparison between a sensor value and a threshold.

In some embodiments, the threshold for a particular transition condition can be adjusted. Such thresholds are referred to herein as adjustable thresholds (e.g., shown as part of transition conditions 306). The adjustable threshold can be changed in response to threshold adjustment parameter 307, which may be provided, for example, by an alarm threshold setting module according to an embodiment. Adjustable thresholds can be selected from one of at least two different selectable thresholds, and any suitable selection criteria can be used to select the appropriate threshold for the adjustable threshold. In one embodiment, the selection criteria can include several single-criteria conditions or a multi-criteria condition. In another embodiment, if the adjustable threshold is compared to sensor values of a first sensor, the selection criteria can include an analysis of at least one sensor other than the first sensor. In another embodiment, the adjustable threshold can be the threshold used in a smoke alarm transition condition, and the adjustable threshold can be selected from one of three different thresholds.

In some embodiments, the threshold for a particular transition condition can be a learned condition threshold (not shown). The learned condition threshold can be the result of a difference function, which may subtract a constant from an initial threshold. The constant can be changed, if desired, based on any suitable number of criteria, including, for example, heuristics, field report data, software updates, user preferences, device settings, etc. Changing the constant can provide a mechanism for changing the transition condition for one or more states (e.g., a pre-alarming state). This constant can be provided to transition conditions 306 to make adjustments to the learned condition threshold. In one embodiment, the constant can be selected based on installation and setup of hazard detection system 300. For example, the home owner can indicate that hazard detection system 300 has been installed in a particular room of an enclosure. Depending on which room it is, system 300 can select an appropriate constant. For example, a first constant can be selected if the room is a bedroom and a second constant can be selected if the room is a kitchen. The first constant may be a value that makes hazard detection system 300 more sensitive to potential hazards than the second constant because the bedroom is in a location that is generally further away from an exit and/or is not generally susceptible to factors that may otherwise cause a false alarm. In contrast, the kitchen, for example, is generally closer to an exit than a bedroom and can generate conditions (e.g., steam or smoke from cooking) that may cause a false alarm. Other installation factors can also be taken into account in selecting the appropriate constant. For example, the home owner can specify that the room is adjacent to a bathroom. Since humidity stemming from a bathroom can cause false alarms, hazard system 300 can select a constant that takes this into account. As another example, the home owner can specify that the room includes a fireplace. Similarly, hazard system 300 can select a constant that takes this factor into account.

In another embodiment, hazard detection system 300 can apply heuristics to self-adjust the constant. For example, conditions may persist that keep triggering pre-alarms, but the conditions do not rise to alarming levels. In response to such persistent pre-alarm triggering, hazard detection system 300 can modify the constant so that the pre-alarms are not so easily triggered. In yet another embodiment, the constant can be changed in response to a software update. For example, a remote server may analyze data acquired from several other hazard detection systems and adjust the constant accordingly, and push the new constant to hazard detection system 300 via a software update. In addition, the remote server can also push down constants based on user settings or user preferences to hazard detection system 300. For example, the home owner may be able to define a limited number of settings by directly interacting with hazard detection system 300. However, the home owner may be able to define an unlimited number of settings by interacting with, for example, a web-based program hosted by the remote server. Based on the settings, the remote server can push down one or more appropriate constants.

The sensor state machines can control alarming states 330 and one or more of other states 320. In particular, smoke sensor state machine 314 can control smoke alarm state 331, CO sensor state machine 316 can control CO alarming state 332, and heat sensor state machine 318 can control heat alarming state 333. For example, smoke sensor state machine 314 may be operative to sound alarm 350 in response to a detected smoke event. As another example, CO sensor state machine 316 can sound alarm 350 in response to a detected CO event. As yet another example, heat sensor state machine 318 can sound alarm 350 in response to a detected heat event. In some embodiments, a sensor state machine can exercise exclusive control over one or more alarming states 330.

The system state machines can control pre-alarming states 340 and one or more of other states 320. In particular, smoke system state machine 315 may control smoke pre-alarm state 341, and CO system state machine 317 may control CO pre-alarm state 342. In some embodiments, each system state machine can manage multiple pre-alarm states. For example, a first pre-alarm state may warn a user that an abnormal condition exists, and a second pre-alarm state may warn the user that the abnormal condition continues to exist. Moreover, each system state machine can manage other states that cannot be managed by the sensor state machines. For example, these other states can include a monitoring state, a pre-alarm hushing state, and post-alarm states such as holding and alarm monitoring states.

The system state machines can co-manage one or more states with sensor state machines. These co-managed states ("shared states") can exist as states in both system and sensor state machines for a particular hazard. For example, smoke system state machine 315 may share one or more states with smoke sensor state machine 314, and CO system state machine 317 may share one or more states with CO sensor state machine 316. The joint collaboration between system and sensor state machines for a particular hazard is shown by communications link 370, which connects the two state machines. In some embodiments, any state change transition to a shared state may be controlled by the sensor state machine. For example, the alarming state may be a shared state, and anytime a sensor state machine transitions to the alarming state, the system state machine that co-manages states with that sensor state machine may also transition to the alarming state. In some embodiments, shared states can include idling states, alarming states, and alarm hushing states. The parameters by which multi-criteria state machines 310 may function are discussed in more detail in connection with the description accompanying FIGS. 4A-8B of United States Publication No. 2015/0022367.

Figure 4:
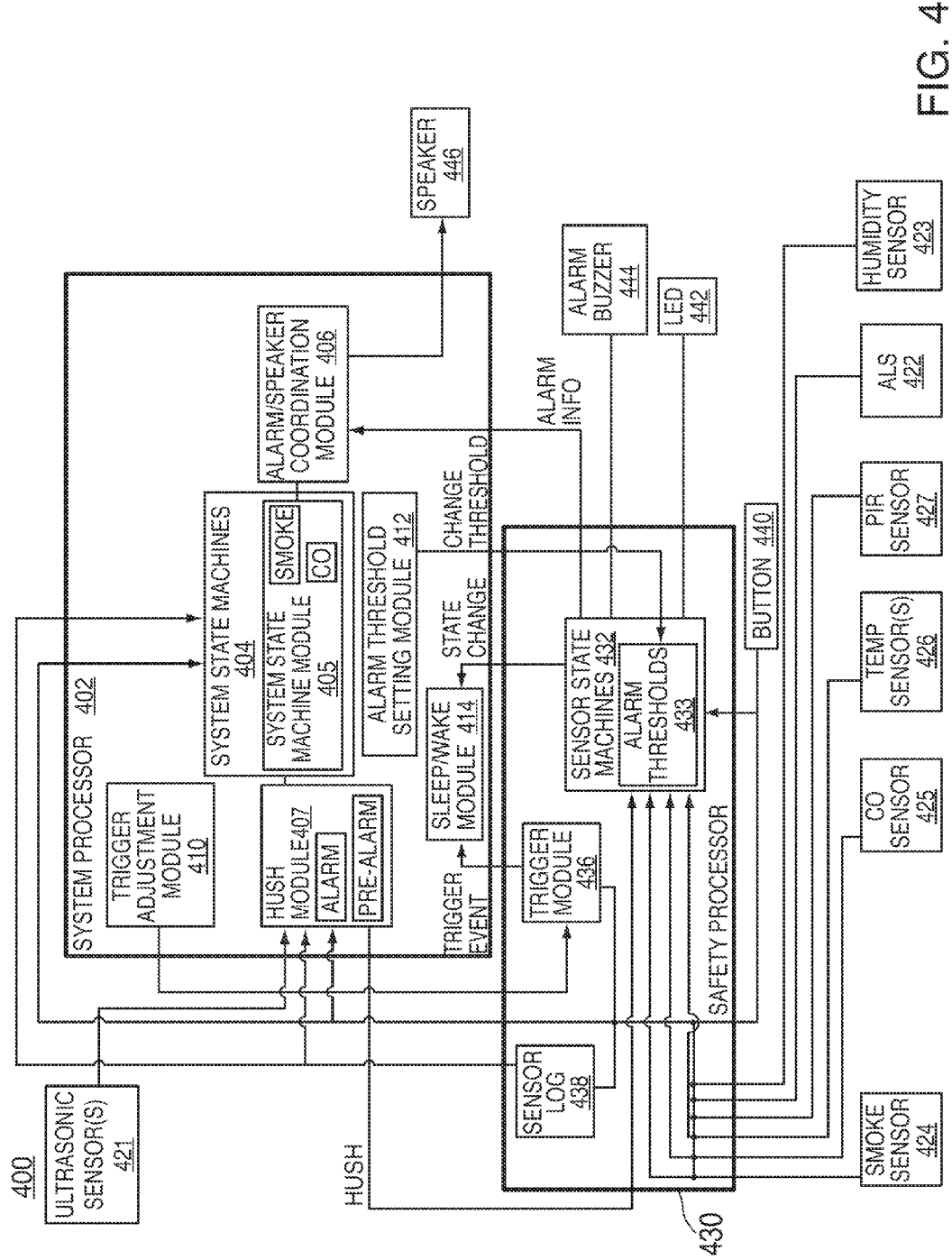
FIG. 4 shows an illustrative schematic of a hazard detection system, according to some embodiments.

FIG. 4 shows an illustrative schematic of hazard detection system 400 according to an embodiment and shows, among other things, signal paths among various components, state machines, and illustrative modules being executed by different processors. System 400 can include system processor 402, safety processor 430, ultrasonic sensors 421, ALS sensor 422, humidity sensor 423, smoke sensor 424, CO sensor 425, temperatures sensors 426, and PIR sensor 427, button 440, LED(s) 442, alarm 444, and speaker 446. System processor 402 can be similar to system processor 210 of FIG. 2. System processor 402 can operate system state machines 404, system state machine module 405, alarm/speaker coordination module 406, hush module 407, trigger adjustment module 410, and sleep/wake module 414. System state machines 404 can access system state machine module 405, alarm/speaker coordination module 406, and hush module 407 in making state change determinations. System processor 402 can receive data values acquired by ultrasonic sensors 421 and other inputs from safety processor 430. System processor 402 may receive data from sensors 422-427, data from sensor log 438, trigger events from trigger module 436, state change events and alarm information from sensor state machines 432, and button press events from button 440.

Safety processor 430 can be similar to safety processor 230 of FIG. 2. Safety processor 430 can operate sensor state machines 432, alarm thresholds 433, trigger module 436, and sensor log 438. Safety processor 430 can control operation of LEDs 442 and alarm 444. Safety processor 430 can receive data values acquired by sensors 422-427 and button 440. All or a portion of acquired sensor data can be provided to sensor state machines 432. For example, as illustrated in FIG. 4, smoke, CO, and heat sensor data is shown being directly provided to sensor state machines 432. Sensor log 438 can store chunks of acquired data that can be provided to system processor 402 on a periodic basis or in response to an event such as a state change in one of sensor state machines 432 or a trigger event detected by trigger module 436. In addition, in some embodiments, even though the sensor data may be stored in sensor log 438, it can also be provided directly to system processor 402, as shown in FIG. 4.

Alarm thresholds 433 can store the alarming thresholds in a memory (e.g., Flash memory) that is accessible by sensor state machines 432. As discussed above, sensor state machines 432 can compare monitored sensor data values against alarm thresholds 433 that may be stored within safety processor 430 to determine whether a hazard event exists, and upon determining that the hazard event exists, may cause the alarm to sound. Each sensor (e.g., smoke sensor, CO sensor, and heat sensor) may have one or more alarm thresholds. When multiple alarm thresholds are available for a sensor, safety processor 430 may initially select a default alarm threshold, but responsive to an instruction received from system processor 402 (e.g., from Alarm/Pre-Alarm Threshold Setting Module 412), it can select one of the multiple alarm thresholds as the alarm threshold for that sensor. Safety processor 430 may automatically revert back to the default alarm threshold if certain conditions are not met (e.g., a predetermined period of time elapses in which an alarm setting threshold instruction is not received from system processor 402).

Safety processor 430 and/or system processor 402 can monitor button 440 for button press events. Button 440 can be an externally accessible button that can be depressed by a user. For example, a user may press button 440 to test the alarming function or to hush an alarm. Safety processor 430 can control the operation of alarm 444 and LEDs 442. Processor 430 can provide alarm information to alarm/speaker coordination module 406 so that module 406 can coordinate speaker voice notification with alarm sounds. In some embodiments, safety processor 430 is the only processor that controls alarm 444. Safety processor 430 can also receive inputs from system processor 402 such as hush events from hush module 407, trigger band boundary adjustment instructions from trigger adjustment module 410, and change threshold instructions from alarm/pre-alarm threshold setting module 412.

As shown, hazard detection system 400 may use a bifurcated processor arrangement to execute the multi-criteria state machines to control the alarming and pre-alarming states, according to various embodiments. The system state machines can be executed by system processor 402 and the sensor state machines can be executed by safety processor 430. As shown, sensor state machines 432 may reside within safety processor 430. This shows that safety processor 430 can operate sensor state machines such as a smoke sensor state machine, CO sensor state machine, and heat sensor state machine. Thus, the functionality of the sensor state machines (as discussed above) are embodied and executed by safety processor 430. As also shown, system state machines 404 may reside within system processor 402. This shows that system processor 402 can operate system state machines such as a smoke system state machine and a CO system state machine. Thus, the functionality of the system state machines (as discussed above) are embodied and executed by system processor 402.

In the bifurcated approach, safety processor 430 can serve as the "brain stem" of hazard detection system 400 and system processor 402 can serve as the "frontal cortex." In human terms, even when a person goes to sleep (i.e., the frontal cortex is sleeping) the brain stem maintains basic life functions such as breathing and heart beating. Comparatively speaking, safety processor 430 is always awake and operating; it is constantly monitoring one or more of sensors 422-427, even if system processor 402 is asleep or non-functioning, and managing the sensor state machines of hazard detection system 400. When the person is awake, the frontal cortex is used to processes higher order functions such as thinking and speaking. Comparatively speaking, system processor 402 performs higher order functions implemented by system state machines 404, alarm/speaker coordination module 406, hush module 407, trigger adjustment module 410, and alarm/pre-alarm threshold setting module 412. In some embodiments, safety processor 430 can operate autonomously and independently of system processor 402. Thus, in the event system processor 402 is not functioning (e.g., due to low power or other cause), safety processor 430 can still perform its hazard detection and alarming functionality.

The bifurcated processor arrangement may further enable hazard detection system 400 to minimize power consumption by enabling the relatively high power consuming system processor 402 to transition between sleep and non-sleep states while the relatively low power consuming safety processor 430 is maintained in a non-sleep state. To save power, system processor 402 can be kept in the sleep state until one of any number of suitable events occurs that wakes up system processor 402. Sleep/wake module 414 can control the sleep and non-sleep states of system processor 402. Safety processor 430 can instruct sleep/wake module 414 to wake system processor 402 in response to a trigger event (e.g., as detected by trigger module 436) or a state change in sensor state machines 432. Trigger events can occur when a data value associated with a sensor moves out of a trigger band associated with that sensor. A trigger band can define upper and lower boundaries of data values for each sensor and are stored with safety processor 430 in trigger module 436. Trigger module 436 can monitor sensor data values and compare them against the boundaries set for that particular sensor's trigger band. Thus, when a sensor data value moves out of band, trigger module 436 registers this as a trigger event and notifies system processor 402 of the trigger event (e.g., by sending a signal to sleep/wake module 414).

The boundaries of the trigger band can be adjusted by system processor 402, when it is awake, based on an operational state of hazard detection system 400. The operational state can include the states of each of the system and sensor state machines, sensor data values, and other factors. System processor 402 may adjust the boundaries of one or more trigger bands to align with one or more system state machine states before transitioning back to sleep. Thus, by adjusting the boundaries of one or more trigger bands, system processor 402 effectively communicates "wake me" instructions to safety processor 430. The "wake me" instructions can be generated by trigger adjustment module 410 and transmitted to trigger module 436, as shown in FIG. 4. The "wake me" instructions can cause module 436 to adjust a boundary of one or more trigger bands.

Figure 5:
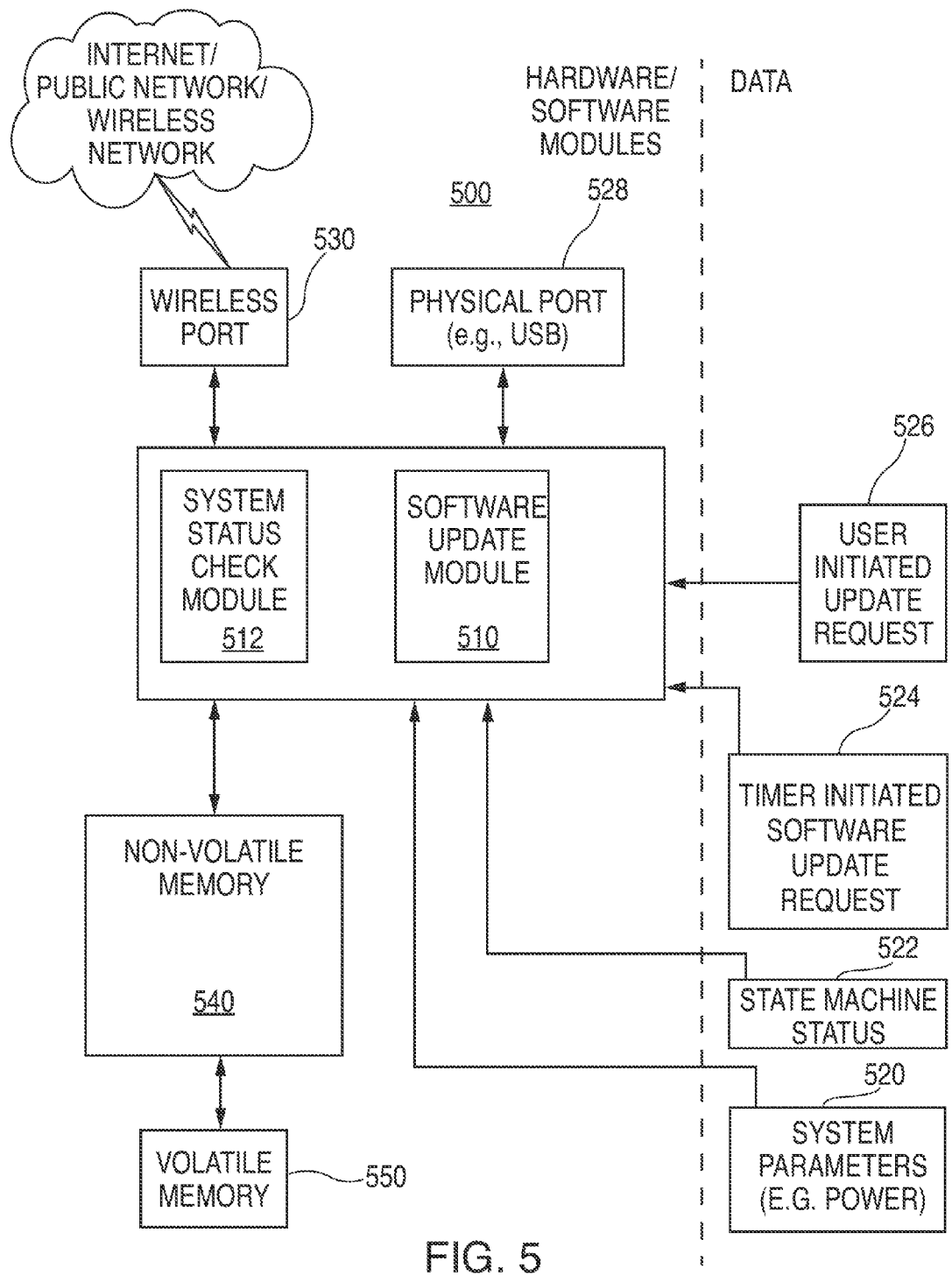
FIG. 5 shows an illustrative schematic diagram of a hazard detection system using a software update module to update software according to an embodiment.
Figure 6:
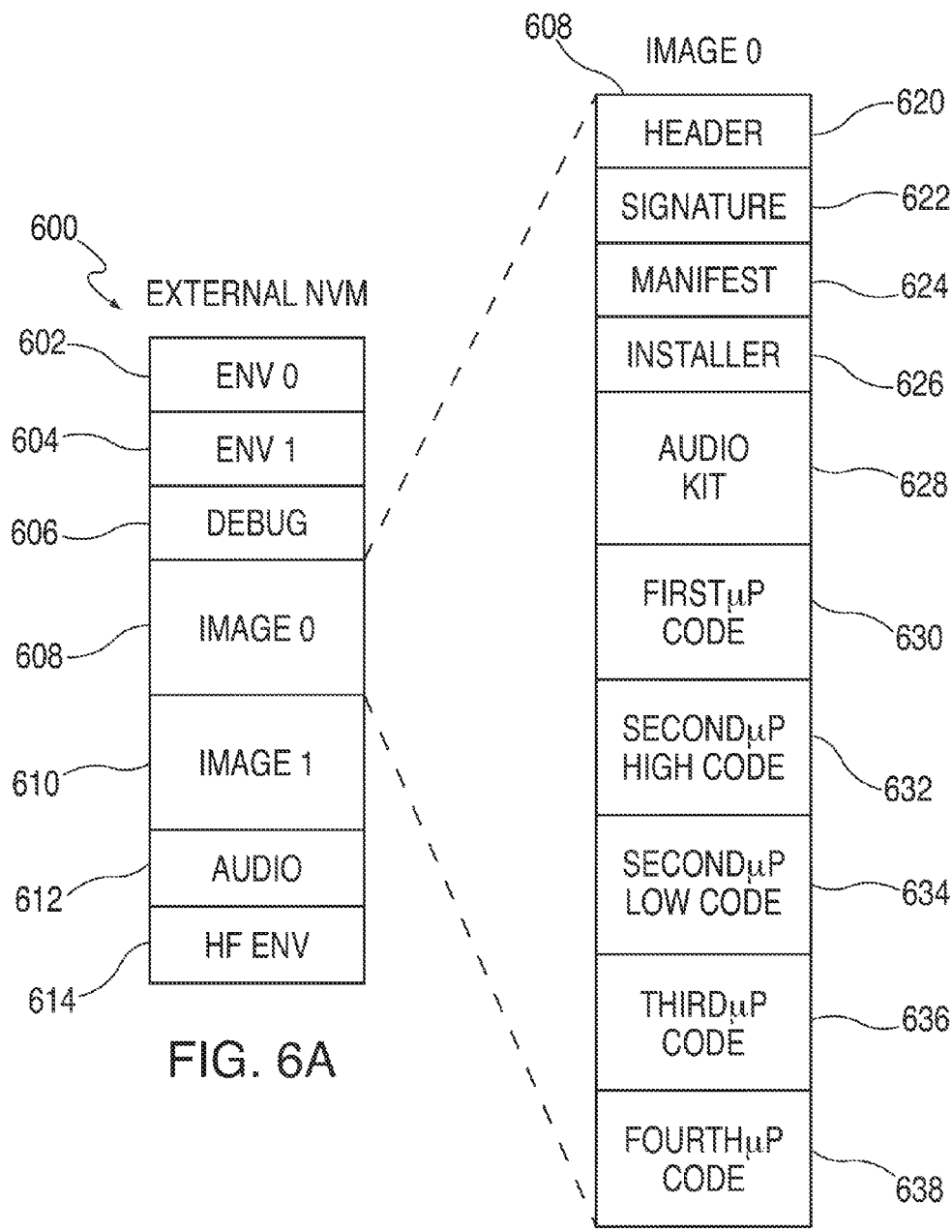
FIG. 6A shows an illustrative schematic of contents contained in non-volatile memory according to an embodiment.
FIG. 6B shows an a more detailed illustrative schematic of a portion of the non-volatile memory of FIG. 6A, according to an embodiment.

FIG. 5 shows an illustrative schematic diagram of a hazard detection system 500 using a software update module 510 to update software according to an embodiment. Software update module 510 may control all aspects of a software updating process by, for example, managing the receipt of a new software package, the authentication of the software package, installation of the package, verification of the installation, and reboot verification using the installed package, all while the hazard detection system monitors its sensors for hazard (or other external) events. Thus, hazard detection system 500 may simultaneously update software and monitor for hazard (or other external) events. In some embodiments, software update module 510 may be performed by the system processor and/or the safety processor.

As shown, FIG. 5 shows system parameters 520, state machine status 522, timer initiated software update request 524, user initiated software update request 526, physical port 528, wireless port 530, non-volatile memory 540, volatile memory 550, and wireless network 560. FIG. 5 is shown to be divided by a dashed line to graphically illustrate which aspects can represent hardware and/or software modules and which aspects can represent data or information. System parameters 520 may represent parameters associated with hardware operation of the system such as, for example, power levels of a power source (e.g., battery power source or a line power source). State machine status 522 may represent the state of each of the state machines operating in system 500. For example, the state machines represented by status 522 can include one or more of the state machines shown and described in connection with FIG. 3 and/or FIG. 4. Software update module 510, and in particular, system status check module 512, may use one or more parameters from system parameters 520 and one or more status indicators from state machine status 522 to determine whether to proceed with a software update. For example, if the system parameters indicate that the power level of the power source is below a fixed threshold, system status check module 512 may prevent or stop a software update process. As another example, if the status of any one of the state machines indicates that it is in a pre-alarm state or an alarm state, then system status check module 512 may prevent or stop a software update process.

Timer initiated software update request 524 may be a timer based instruction that prompts software update module 510 to initiate a software update. The timer may be set on a periodic schedule (e.g., once a day) or may be changed depending on various factors such as, for example, available power levels and estimated end of life of system 500. User initiated update request 526 may be a user initiate instruction that prompts update module 510 to initiate a software update. A user may initiate a software update by pressing a button (not shown) of the system for an extended period of time, communicating a request wirelessly to the system 500 via the wireless port 530, communicating a wired request to the system 500 via the physical port 528, or other fashion.

Wireless port 530 may represent an antenna and associated circuitry for receiving a software update package and/or other information over the air. For example, wireless port 530 may be similar to high power wireless communications circuitry 212 of FIG. 2 (or other 802.11, 802.15.4, or other wireless protocol) circuitry. Over the air downloading of software updates may occur when the hazard system has been registered with a remote server (e.g., a server hosted by a company providing software updates). The hazard system may periodically communicate with the server and download a new software update package, if available. The downloaded software update package can be stored in NVM 540. Software update module 510 may activate the downloaded software when system conditions are such to permit execution of a software update process, which can include installing code in one or more processors and/or devices and selectively rebooting those processors and/or devices. Additional details on how software update module 510 handles software update packages received via wireless port 530 is discussed in more detail below in connection with FIGS. 8 and 9.

Physical port 528 may represent a physical port (e.g., USB port) through which a software update package and/or other information may be received. The hazard detection device may receive software update packages by being connected to, for example, a computer via a cable (e.g., USB cable). When the hazard system and the computer are connected, the computer may copy the software update package to NVM 540. When the software update package is received, software update module 510 may authenticate the downloaded software update package and perform a software update process in a manner similar to that performed with software updates received over the air. Additional details on how software update module 510 handles software update packages received via physical port 528 is discussed in more detail below in connection with FIG. 10.

Non-volatile memory 540 may be any suitable storage medium capable of permanent storage. Examples of non-volatile memory 540 can include flash memory, EEPROM, hard-disk drive memory, phase change memory, and 3D memory. As will be explained in further detail below, non-volatile memory 540 may store software used by system 500 and may also store software update packages received via port 528 or port 530. Non-volatile memory 540 may be a non-volatile memory that operates independently of any non-volatile storage contained within or associated with various processors of system 500. For example, both the system and safety processor may include their respective non-volatile memories and/or volatile memories that are separate and distinct from memory 540. For example, each processor and/or device operating within the hazard detection system may nm code from its own volatile and/or non-volatile memory when operating, and this code may be obtained from NVM 540. Volatile memory 550 may be any suitable volatile memory such as RAM, DRAM, or SDRAM.

FIG. 6A shows an illustrative schematic of contents contained in non-volatile memory (NVM) 600 according to an embodiment. NVM 600 may represent NVM 540 of FIG. 5, for example. NVM 600 may contain several partitions or portions, each operative to store software and other information that may be used by a hazard detection system. As shown, NVM can include ENV 0 portion 602, ENV 1 portion 604, debug portion 606, Image 0 portion 608, Image 1 portion 610, audio portion 612, and HF ENV 614. The number of portions shown is merely illustrative and it will be appreciated that additional portions may be included and that one or more portions may be omitted. In addition, the size allocated to each portion may vary. ENV portions 602 and 604 can store environment variables of the device. These variables can persist over reboot and contain information that is either descriptive of the unique device or descriptive of the device's current state. For example, one or more of ENV portions 602 and 604 may include state machine status 522. During operation, the system may alternate between writing data to portions 602 and 604. HF Env portion 614 can optionally store high frequency environment variables. For example, portion 614 can store variables that need to be changed very frequently, such as for security purposes. Debug portion 606 may include code for implementing debugging operations. Image 0 and 1 portions 608 and 610 may each include a different version of code for enabling operation of the hazard detection system. Audio portion 612 may store one or more audio files, for example, that may be played back through the speaker (e.g., speaker 218).

Image portions 608 and 610 can be either an active or inactive portion, depending on which portion is currently being used for the software executing on the hazard system. For example, if the hazard system booted using code stored in image portion 608, image portion 608 would be the active portion, and image portion 610 would be the inactive portion. As defined herein, an active portion of code may be code that has been installed in (and being run from) the 'local' memory associated with a processor. As defined herein, an inactive portion of code may be code that exists in a memory (e.g., NVM) but is not currently installed in (and being run from) the 'local' memory associated with a processor. During a software update process (e.g., an over the air download embodiment), a newly downloaded software update package can be stored in the inactive portion. In other embodiments, the downloaded software update package can be stored in any available portion, including the active portion. The software stored in NVM 600 may serve as storage for all of the software running on each of the processors and/or devices contained within the hazard system, but not all the code is executed from the NVM 600. Respective code portions for each processor and/or device can be installed therein and the locally installed code may be executed.

FIG. 6B shows an illustrative schematic of sub-portions of one of the image portions of NVM 600 according to an embodiment. FIG. 6B shows, for example, the sub-portions of image 0 portion 608. It is understood that the arrangement of image 1 portion 610 may be the same as image 0 portion 608, but one or more of the sub-portions may be different. For example, the audio kit portion for image 0 (e.g., audio for English) may be different than the audio kit portion for image 1 (e.g., audio for Spanish). As shown, image 608 can include header portion 620 (e.g., an ELF header), signature portion 622, manifest portion 624, installer portion 626, audio kit portion 628, first µP portion 630, second µP portion 632, second µP portion 634, third µP portion 636, and fourth µP portion 638.

Each portion can include code and/or data necessary to identify information or perform operations associated with its name. For example, header portion 620 can include header information for identifying the location of image 0 in NVM 600. Signature portion 622 may include proprietary information used for authentication. Manifest portion 624 may specify the contents of image 0. For example, manifest portion 624 may specify the software version and its audio kit language. Audio kit portion 628 may contain code and/or files for enabling playback of speech in a specific language. For example, in one embodiment, audio kit portion 628 for image 608 may include speech files in the English language, whereas an audio kit portion for image 610 may include speech files in the French language.

Microprocessor (µR) portions 630, 632, 634, 636, and 638 may each store code or firmware for enabling operation of its (or their) respective microprocessor. The code stored in portions 630, 632, 634, 636, and 638 may be installed in and executed by their respective microprocessors. For example, first (µR) portion 630 may include firmware for enabling a first µP to operate. In some embodiments, the first µP may be similar to system processor 210 of FIG. 2 or processor 402 of FIG. 4. Second µP portions 632 and 634 may include firmware for enabling a second µP to operate. In some embodiments, the second µP may be similar to safety processor 230 of FIG. 2 or processor 430 of FIG. 4. Inclusion of two separate portions 632 and 634 for the same processor will become apparent in the discussion below in connection with FIGS. 11-12. Third µP portion 636 may be provided for use with a third processor (e.g., a WiFi processor or high power wireless communications circuitry 212 of FIG. 2). Fourth µP portion 638 may be provided for use with a fourth processor (e.g., a 802.15.4. or low power wireless communications circuitry 214 of FIG. 2).

Figure 7:
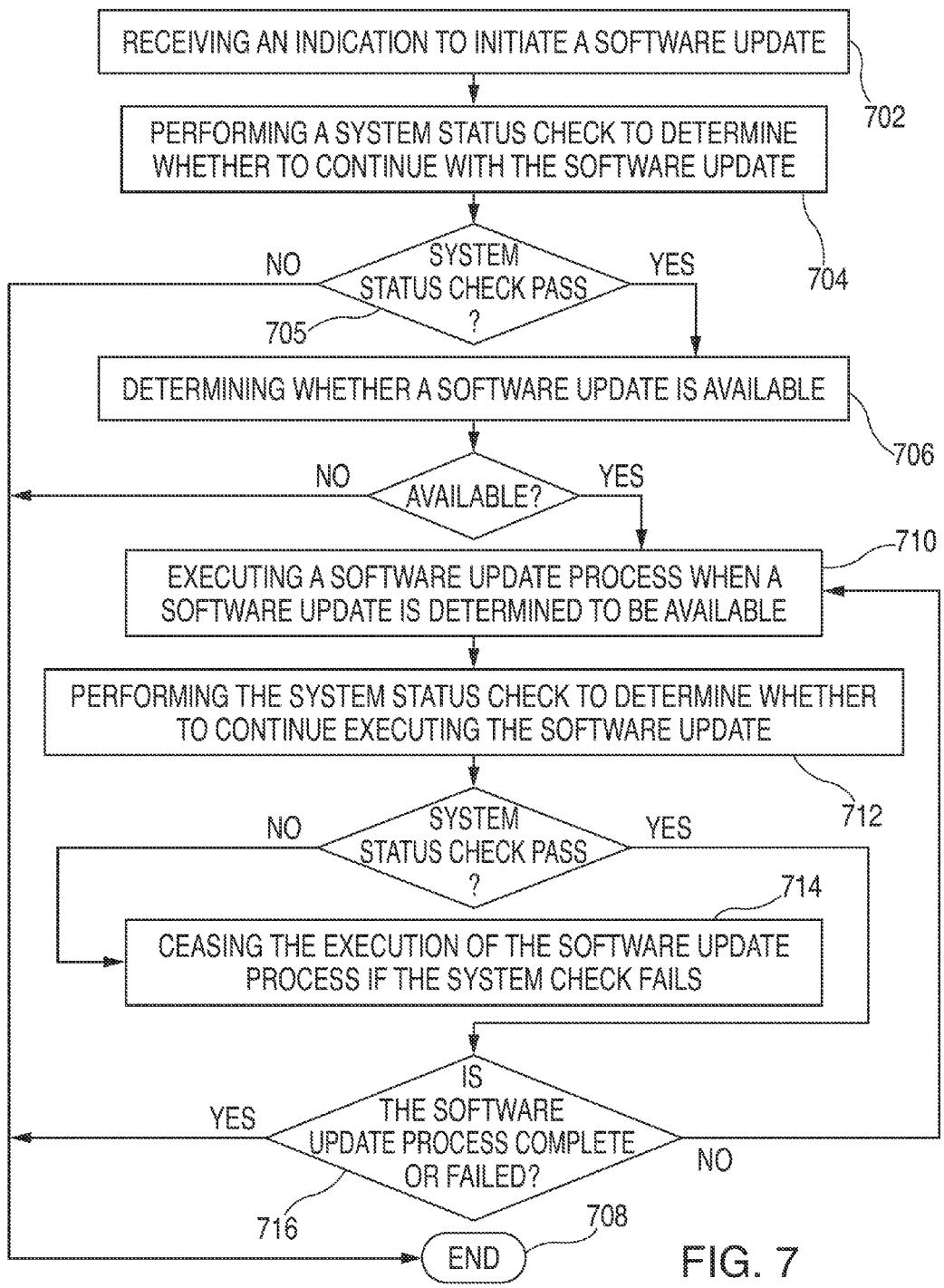
FIG. 7 shows an illustrative flowchart of steps that may be implemented by a hazard detection system when implementing a software update according to an embodiment.

FIG. 7 shows an illustrative flowchart of steps that may be implemented by a hazard detection system when implementing a software update according to an embodiment. FIG. 7 may represent a relatively generic hazard detection system implantation for updating software, whereas FIGS. 8, 10, and 12 may represent relatively more specific hazard detection system implementations for updating software. Starting with step 702, an indication may be received to initiate a software update. For example, a software update timer (e.g., timer initiated request 524) may cause the hazard system to initiate a software update. As another example, a user may initiate a software update by pressing a button for at least a predetermined period of time (or a sequence of buttons within a predetermined period of time), communicating a request to the hazard system either wirelessly or by a wired connection, etc. As yet another example, the indication may be received when the hazard detection system is connected to a computer via physical port 528. In response to receiving this indication, the software update module, for example, may perform a system status check to determine whether to continue with the software update, as indicated by step 704. For example, system status check module 512 may verify that none of the state machines are in an alarm or pre-alarm state and that the sufficient power levels are present. If the system status check fails, then the hazard system may end the software update, as indicated by step 708.

If the system status check passes (at step 705), then the hazard system may determine whether a software update is available, at step 706. In one embodiment, the hazard system may access a remote server via a network (e.g., internet) by using, for example, wireless port 530. When accessing the remote server, the hazard system may transmit any manifests it has stored therein (e.g., manifest contained in images portions 608 and 610) and/or other information to the remote server so the server can determine whether an update is required for that particular hazard system. For example, the manifest may specify the software version for each processor. If the remote server determines that the hazard system needs an updated software package, it may transmit it to the hazard system. For example, if only one of the processors requires an update, the updated software package may include an updated code portion for that processor and the code portions for other processors. In another embodiment, the hazard system may check whether a software update is available when the system is connected to a computer or portable memory device (e.g., a USB memory stick) via its physical port 528. If a new version of software if available, the computer may provide that update to the hazard system.

Then, at step 710, the system may execute a software update process when a software update is determined to be available. The execution of the software update process may involve execution of multiple steps. Additional details of how the software update process is performed are discussed below. The system may perform system status checks to determine whether to continue executing the software update, as indicated by step 712. The system status checks may be performed multiple times throughout the software update process. If, at any time, the system status checks fails, execution of the software update process may cease, as indicated by step 714. Execution of the software update process may continue until it is complete, fails, or ceases due to status check failure, as indicated by step 716.

It is understood that the steps shown in FIG. 7 are merely illustrative and that additional steps may be added, that some steps may be omitted, and that the order of steps may be rearranged.

Figure 8:
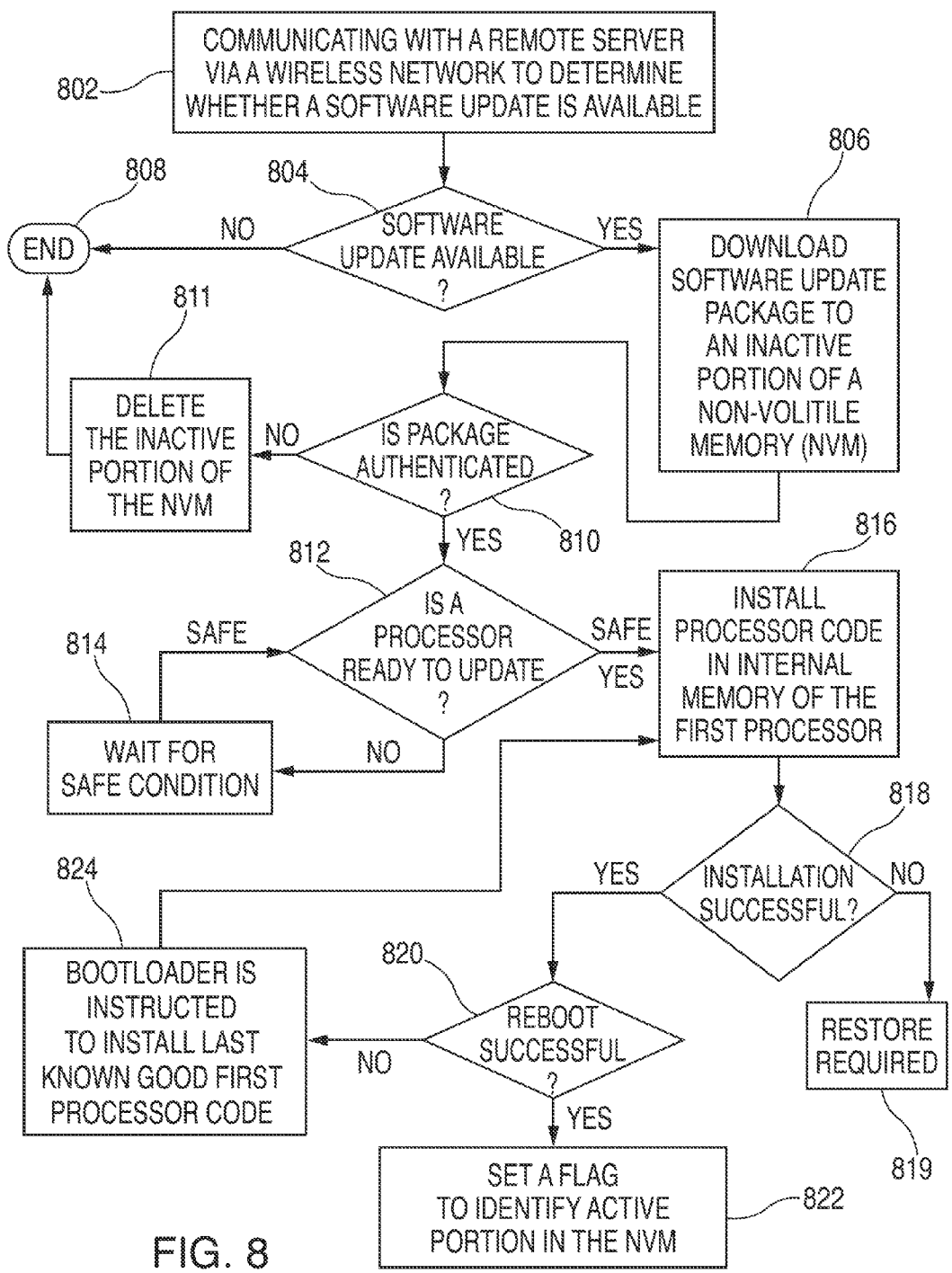
FIG. 8 shows an illustrative flowchart of steps for updating software over the air, according to an embodiment.

FIG. 8 shows an illustrative flowchart of steps for updating software over the air, according to an embodiment. Referring briefly to FIG. 2, over the air reception can involve communicating with a remote server (not shown) via a network such as the Internet using high power communications circuitry 212. Beginning with step 802, the hazard detection system can communicate with the remote server to determine whether a software update is available. The system may check for new software updates on a periodic basis (e.g., in response to timer 524) or on demand (e.g., in response to a user request). If, at step 804, a software update is available, the process can proceed to step 806, otherwise the process may end, as indicated by step 808. At step 806, the software update package is downloaded to an inactive portion on the non-volatile memory. For example, if image portion 608 is active, then the package can be downloaded into image portion 610.

At step 810, the downloaded software package can be authenticated. The software package can be authenticated using any suitable technique. For example, in one approach the software update module can perform a series of integrity checks through a series of secure hash algorithm (SHA-1) checks on every code package within a software update binary. If the downloaded software package fails authentication, then the downloaded software update package may be deleted. In one approach, the entirety of the memory portion storing the unauthorized software update package (i.e., the inactive portion of the NVM) may be deleted, as indicated by step 811. Once deleted, the process may stop at step 808. If the downloaded software package passes authentication, then the process proceeds to step 812. At this point in the process, the authorized software update package is stored in an inactive portion of the NVM, but it is not yet being executed by any processor within the hazard detection system. The following steps, including the steps in the flowchart corresponding to FIG. 9, involve installing a code portion in a processor (e.g., a system processor) and enabling that processor to execute a portion of the code in the authenticated software update package. These steps may be followed to update one or more other processors within the hazard detection system.

Some processors may have the ability to independently decide whether to update their software. For example, system processor 210 and safety processor 230 may each independently make such a decision. These processors may be to check the downloaded software update package to determine whether an update is available. In one embodiment, the downloaded software update package can specify which code portions are new, thereby enabling selective processor code updating. For example, if the software update code only includes software updates for two of four processors, process steps of FIGS. 8, 9, and/or 10 may be performed to update those two processors. Some processors may not have the ability to independently decide whether to update their code. These processors may update their code, regardless of whether the package includes an update for those processors.

At step 812, the hazard system (e.g., a first processor of the hazard system, such as system processor 210) may determine whether system status conditions are satisfied before commencing with the update of the first processor's executable code. The system status conditions can include the power level of a power source and whether any of the system's state machines are in an alarm or pre-alarm state. If any of the system status conditions are not satisfied, then the process may be delayed, at step 814, until those conditions are satisfied. Since updating the executable software for the first processor requires taking the first processor offline, it may not be desirable to update the software when any one of the system status conditions is not satisfied. This enables the first processor, such as the system processor 210, to execute higher order functions such as pre-alarm notifications, process touchless hush commands, perform wireless communications, and other features during an alarm or pre-alarm event. It should be appreciated, however, that when the first processor is taken offline to have its software updated, a second processor (e.g., the safety processor 230) is still functioning independently thereof and is able to monitor for hazardous or other conditions and provide an alert when appropriate.

If the conditions are satisfied at step 812, the processor code portion (e.g., first (µP) portion 630) may be installed within the processor, as indicated by step 816. If desired, code for at least one processor that does not exercise independent authority in updating its code can be installed at this step. For example, the third and fourth processors (e.g., the high power wireless communications circuitry 212 and the low power wireless communications circuitry 214, respectively), but not the second processor (e.g., safety processor 230) can be updated at this step. The second processor (e.g., safety processor 230) may independently decide when to update itself, and is not committed to being updated at a time commensurate with the software updating of any other processor. The installation process can include several steps, which are discussed in more detail in connection with FIG. 9. Generally speaking, installation can include deletion of the existing processor code in the processor's non-volatile memory, programming of the new processor code in its NVM, and verification that the new code successfully completed installation. If installation is successful at step 818, the first processor is rebooted and processing may proceed to step 820 where it is determined whether that reboot is successful. As will be discussed in more detail below, if installation of the new processor code is not successful, the system may try to install the old processor code. If installation of any processor code is not successful, at step 818, then the process may proceed to restore required step 819. The system may reach step 819 if no code installation is successfully completed, and as a result, the system may require a restore operation that requires connecting the system to a computer via port 528 to receive new software.

If, at step 820, the reboot operation is successful with the newly installed processor code, a flag (e.g., ENV flag 0 or 1) may be set to identify which portion is the new active portion, as indicated by step 822, and end at step 808. The flag may be set by code running (sometimes referred to as "osm" code) in the software module running on the first processor. Once booted, the first processor and other booted processors are operating in accordance with the design of the hazard system. For example, if the new software update package was copied into image portion 610, and image portion 610 contains the code that was successfully installed in the first processor and booted therefrom, then the image portion 610 may be set as the active portion. If, at step 820, the reboot operation fails after a fixed number of times, the software module may instruct the boot loader to install the last known good version of the processor code (e.g., the code contained in the active portion), at step 824. The system may then progress through steps 816, 818, 820, and 822, as previously discussed but in this case using the processor code from the last good version.

It is understood that the steps shown in FIG. 8 are merely illustrative and that additional steps may be added, that some steps may be omitted, and that the order of steps may be rearranged.

Figure 9:
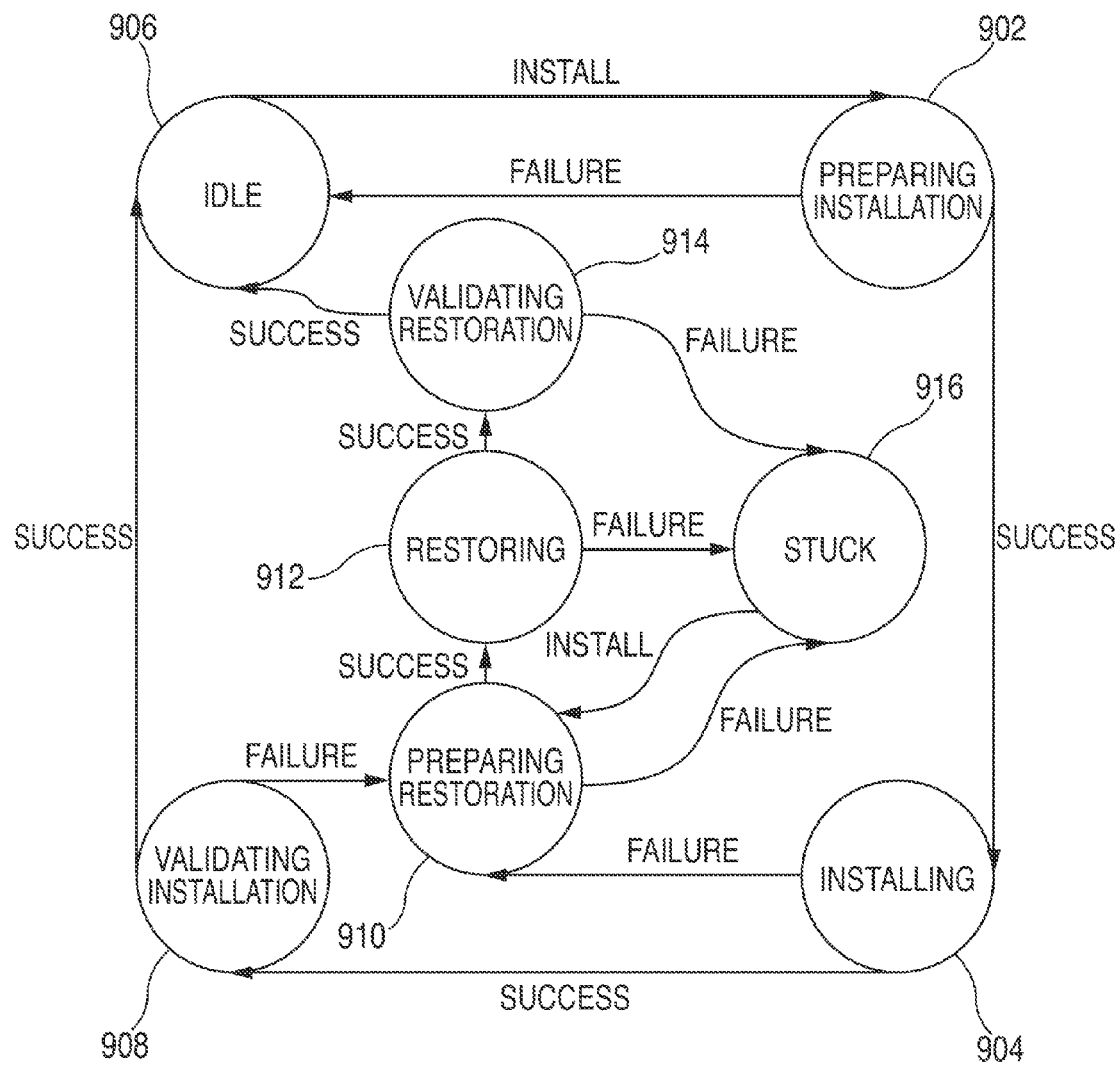
FIG. 9 shows an illustrative flowchart of steps for installing executable code in a processor such as a system processor, according to an embodiment.

FIG. 9 shows an illustrative state diagram including operational steps for installing executable code in a processor such as a system processor, according to an embodiment. The state diagram of FIG. 9 may, for example, be implemented in step 816 of FIG. 8. In one embodiment, the operational steps reflected by the state diagram of FIG. 9 may be implemented by a software install module and can be used when updating software in one or more processors. Discussion of FIG. 9 begins by discussing a successful installation, followed by discussion of recovering from an unsuccessful installation, and finishing with an installation failure. The installation process may begin at step 902 when an install command is received from a source (not shown). At step 902, the install module, which may be, e.g., a sub-module of software update module 510, may prepare a processor (such as the first processor discussed above) for executable code installation. This may involve determining which code portion contained within an image of the NVM that should be installed. If the preparation is successful, the install module proceeds to step 904. If the preparation is not successful, the install module proceeds to idle step 906, during which another install command may be received by the installer.

At If preparation of the installation is successful, processing may proceed to step 904, where the install module may install the executable code (e.g., first µP code 630) into the processor (e.g., system processor 210). If the processor is the system processor, the code may be installed in the processor's NVM. If the processor is an 802.11 processor, the code may be installed in the processor RAM. If installation is successful, the install module may validate the installation at step 908. Validation can be performed using number of suitable approaches, including, for example, a SHA check. If installation is validated, then the install module proceeds to idle step 906, and awaits further instructions.

If a failure occurs at step 904 or step 908, the install module may prepare a restoring operation at step 910. Preparation of the restoring operation can include locating another version of the code (e.g., the last known good version) sought to be updated. If the restoration preparation is successful, the installer may restore the other code version at step 912. If restoration of the code is successful, the installer may validate the restoration at step 914. If the restoration is valid, the installer may proceed to idle at step 906.

If failure occurs at any of steps 910, 912, or 914, the install module may proceed to a stuck state, at step 916. When in the stuck state, the installer may attempt to prepare restoring from another local copy contained with the hazard system's NVM. If successful, the installer will proceed through steps 912 and 914. If the restore is still unsuccessful, the system may need to be connected to a computer to receive the appropriate software update.

It is understood that the steps shown in FIG. 9 are merely illustrative and that additional steps may be added, that some steps may be omitted, and that the order of steps may be rearranged.

Figure 10:
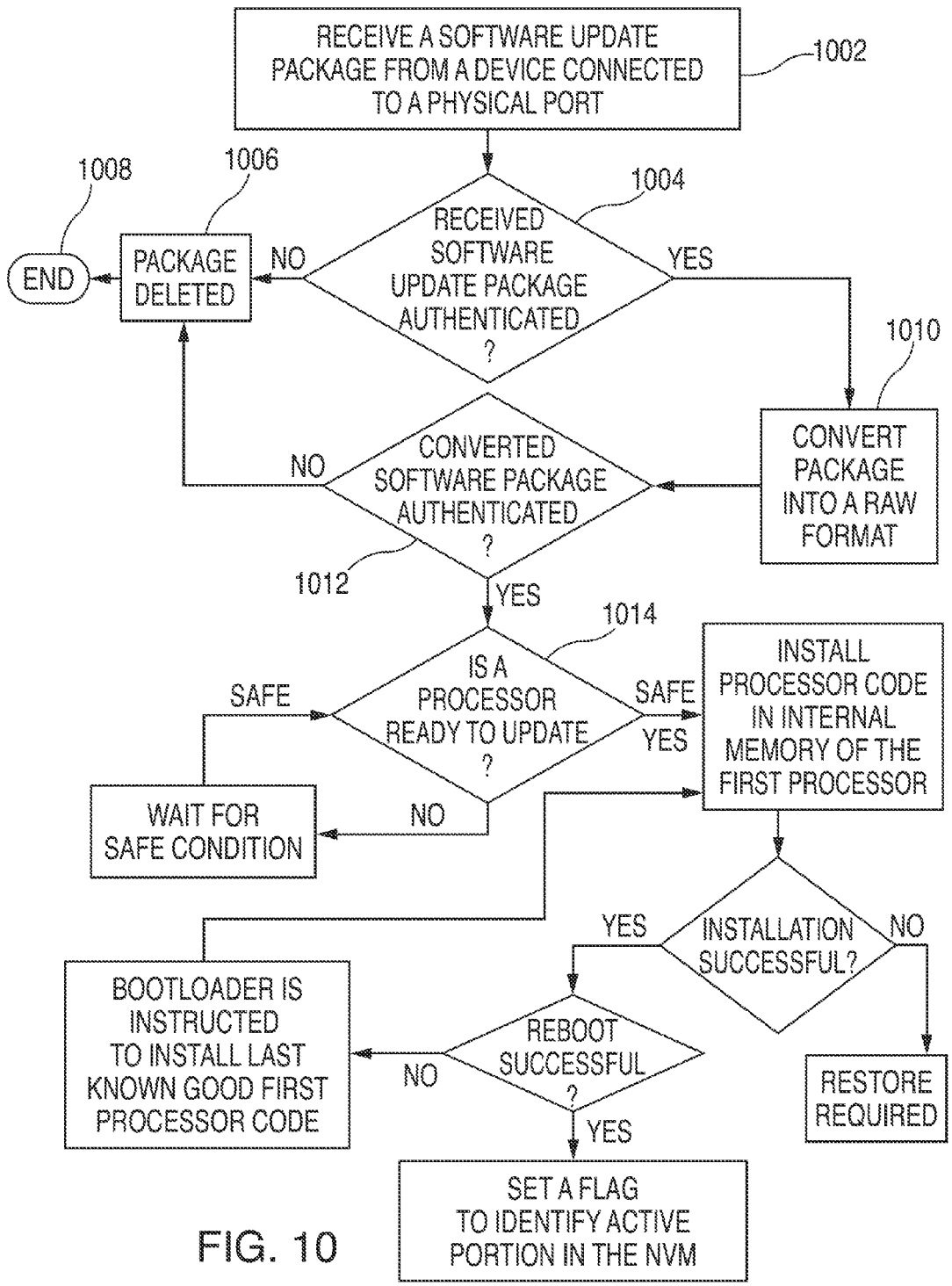
FIG. 10 shows an illustrative flowchart of steps for updating software via a physical port, according to an embodiment.

FIG. 10 shows an illustrative flowchart of steps for updating software via a physical port, according to an embodiment. Beginning with step 1002, the hazard detection system, and in particular, the software update module may detect and receive a software update package from a computer connected to a physical port of the hazard detection system. This software update package may be stored in an inactive portion of the NVM. At step 1004, the downloaded software package may be authenticated. The software package can be authenticated using any suitable technique. For example, in one approach the software update module can perform a series of integrity checks through a series of secure hash algorithm (SHA-1) checks on every code package within a software update binary. If the downloaded software package fails authentication, then the downloaded software update package may be deleted, as indicated by step 1006. In one approach, the entirety of the portion storing the unauthorized software update package may be deleted. Once deleted, the process may stop at step 1008. If the downloaded software package passes authentication, then the process proceeds to step 1010. At this point in the process, the authorized software update package is stored in an inactive portion of the NVM, but it is not yet being executed by any processor within the hazard detection system.

In some embodiments the downloaded software update package may be in a format suitable for the computer from which it was transferred, but it is not in a format suitable for use by the hazard detection system. For example, the downloaded packages may be arranged according to a FAT file system structure, but the hazard detection system may need the package to be arranged in a RAW format. At step 1010, the downloaded software package is converted into a converted software package and stored in another portion of the NVM. Depending on available storage space, in some embodiments, the converted package may be stored in the active portion, thereby overwriting the image currently being used by the hazard detection system.

In step 1012, the converted software package is authenticated. If authentication fails, the process proceeds to deletion step 1006. If authentication passes, then the process proceeds to step 1014. Step 1014 and the following steps are similar to the steps discussed above in connection with FIG. 8, and as such, the discussion will not be repeated. In some embodiments, if authentication passes, the process may bypass step 1014 and proceed directly to installation of the processor code in internal memory of the processor.

It is understood that the steps shown in FIG. 10 are merely illustrative and that additional steps may be added, that some steps may be omitted, and that the order of steps may be rearranged.

Figure 11:
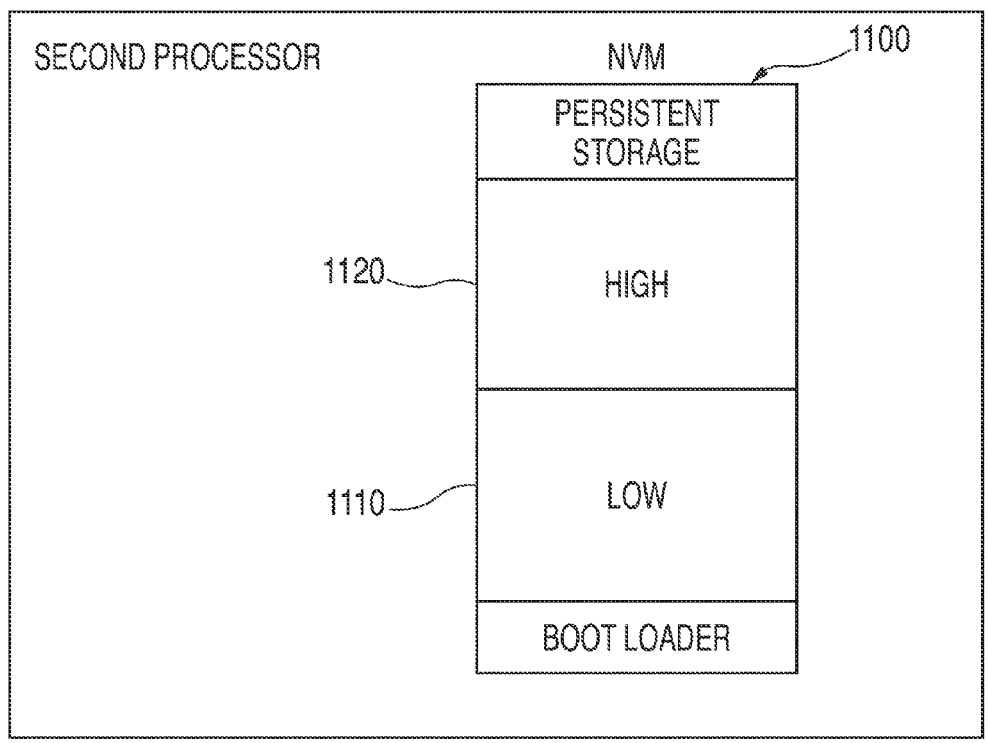
FIG. 11 shows an illustrative schematic diagram of non-volatile memory contained in a second processor, according to an embodiment.

FIG. 11 shows an illustrative schematic diagram of non-volatile memory (NVM) 1100 contained in a second processor such as a safety processor, according to an embodiment. NVM 1100 may reserve space for persistent data storage (i.e., data that is maintained throughout the life of the system), NVM specific data such as boot loader data, and executable code data portions 1110 and 1120. Executable code data portions 1110 and 1120 may each store a version of executable code that may be executed by the safety processor. Portion 1110 may be referred to herein as the LOW code portion and portion 1120 may be referred to herein as the HIGH code portion. During operation, one of the LOW and HIGH portions is active and the other inactive. For example, if the LOW portion is active, the safety processor may execute the code stored in the LOW portion. The HIGH portion may be inactive and available to be overwritten with new code while the safety processor operates based on the code stored in the LOW portion.

Figure 12:
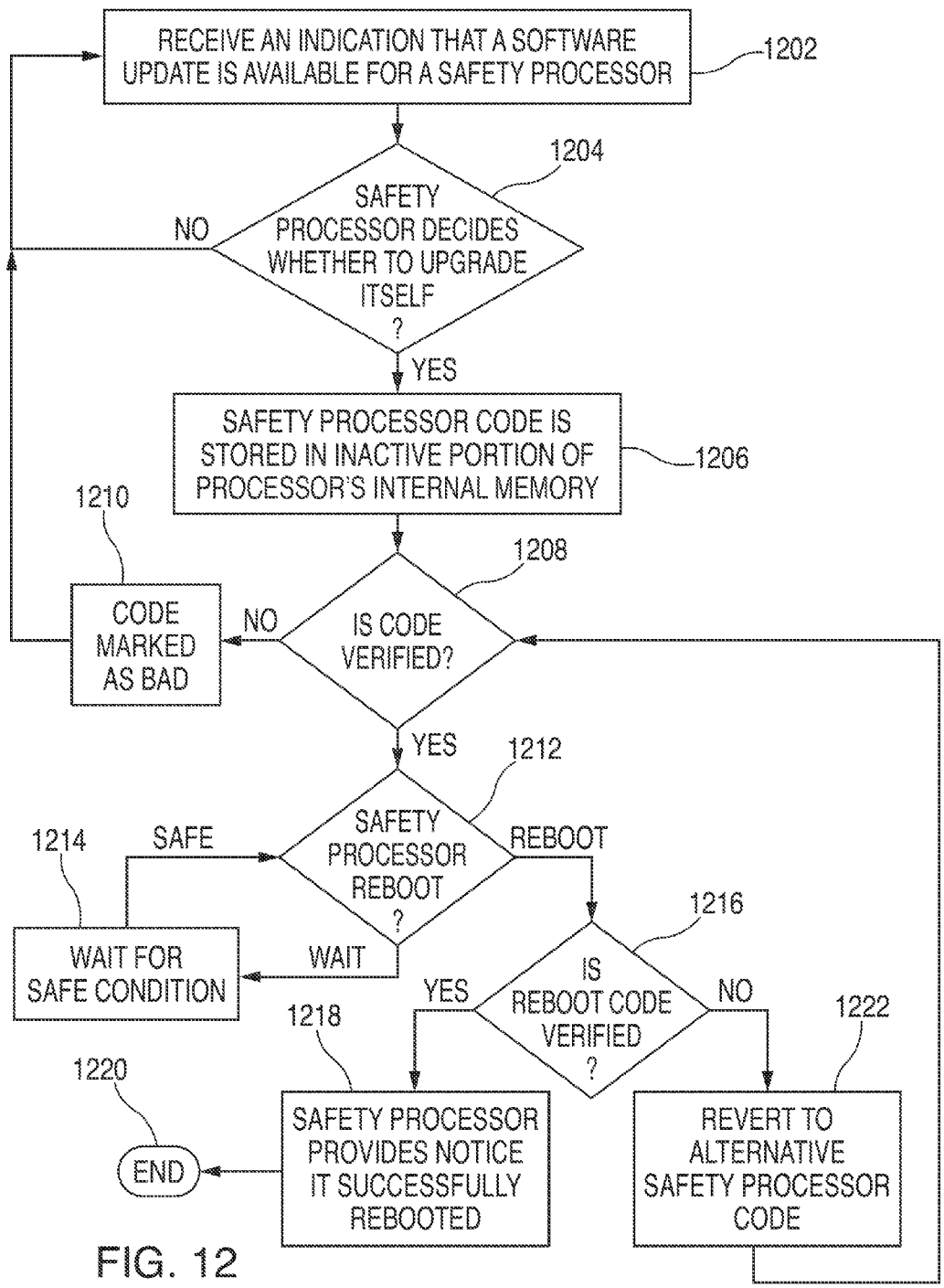
FIG. 12 shows an illustrative flowchart of steps for updating software in a safety processor, according to an embodiment.

FIG. 12 shows an illustrative flowchart of steps for updating software in a processor that independently decides whether to update its software, according to an embodiment. In one embodiment, such a processor can be a safety processor (e.g., safety processor 230). As discussed above, the safety processor may serve as the "brain stem" or "medulla oblongata" of the hazard detection system and is responsible for monitoring sensors for hazardous conditions and activating an alarm in response to a detected presence of one or more hazardous conditions. As such, it maintains independent control over its operation, including deciding when to upgrade software contained within its internal memory. The decision can be made independent from the system processor operation and independent from the timing of the system processor notifying the safety processor that a software update is available. Starting with step 1202, the safety processor may receive an indication from another processor such as the system processor that a software update is available. For example, when a software update package is received and stored in the system NVM (e.g., NVM 540), the system processor may determine whether the update package contains new code for the safety processor. The system processor can determine whether the safety processor requires any updating by asking the safety processor for a version check. In response to receiving such a request, the safety processor may provide the system processor with an indication of which version of software it is running. If the system NVM contains a newer version than that running on the safety processor, the system processor may issue a notification to the safety processor that new software is available. At step 1204, the safety processor decides whether to accept the system processor's request to update. The safety processor may check its state machines to make certain no alarm or pre-alarm states are active before making this decision. If the decision is NO, the process loops back to step 1202. If the decision is YES, the code is written to the inactive portion of the safety processor's internal storage, as indicated by step 1206.

The code copied from the system NVM (e.g., NVM 540) may depend on which portion is actively being used by the safety processor. Referring briefly to FIG. 6B, the image contained two portions of safety processor code (e.g., portions 632 and 634). Both of these portions 632 and 634 may be substantially the same (one is labeled HIGH and the other is labeled LOW), but the portion that is copied to the safety processor may correspond to the correspondingly similar portion that is inactive. For example, if the LOW portion in the safety processor NVM (e.g., portion 1110) is inactive, then the LOW portion 630 in NVM 600 is copied over from NVM 600 to the safety processor. At step 1208, the integrity of the copied code stored in the inactive portion is verified. For example, the copied code may be verified using a SHA1 integrity check. If the integrity check fails, the code stored in the inactive partition may be marked as bad, as indicated by step 1210, and the process loops back to step 1202. If the code is marked bad, this may be communicated to the system processor, which may re-attempt to update the safety processor code.

If the integrity check passes at step 1208, the safety processor may determine whether it can reboot at step 1212. The safety processor may reboot if it determines that there is no indication of an imminent hazard being detected by any of the sensors it monitors. As defined herein, an imminent hazard may be a precursor to an actual hazard. For example, a smoke sensor state machine may have several states, including, a monitor state, a pre-alarm state, and an alarm state. As smoke levels rise and certain conditions are met, the state machine may transition from the monitor state, to the pre-alarm state, and then to the alarm state. The monitor state and pre-alarm state may be considered imminent hazards and the alarm state may be considered an actual hazard. If the safety processor detects an unsafe condition, it may wait at step 1214 for the conditions to become safe before proceeding with a reboot. Thus, it should be appreciated that the safety processor is still able to monitor one or more sensors for an alarm event while its inactive portion is replaced with updated code. In addition, the safety processor may be able to communicate data (e.g., sensor data and alarm event notifications) to the system processor while its inactive portion is being updated. The safety processor may continue to monitor its sensor(s) until it is rebooted.

When it is determined safe (or otherwise an acceptable time) to reboot, a boot loader can locate the "newest" code in both the LOW and HIGH portions and boot using that code. After the reboot, an integrity check on that "new" code can be performed, as indicated by step 1216. The boot loader may examine a flag in the safety processor's NVM to determine which portion is the new code. If the boot loader cannot determine which code is the new code, it may select one of the portions and proceed. The integrity check can be a SHA1 integrity check, for example. If the integrity check is valid after a successful reboot, the safety sensor may inform the system processor that it has successfully rebooted, as indicated by step 1218. The safety sensor software update process may end at step 1220. After step 1220, the system processor may request a version check from the safety processor to confirm whether the safety processor code was successfully updated. If the safety processor returns an older version, the system process may ask the safety processor to try updating its software again.

If the integrity check at step 1216 fails, the boot loader may mark the inactive portion as bad or invalid and revert back to a previously known good portion, as indicated by step 1222. The boot loader may select, for example, the safety processor code in the active portion, reboot using the code in the active portion, and perform an integrity check on the code after the reboot. If the safety processor is unable to reboot from any portion containing safety processor code, the system processor may detect this reboot failure and notify users of the hazard system device that it is experiencing technical difficulty.

It is understood that the steps shown in FIG. 12 are merely illustrative and that additional steps may be added, that some steps may be omitted, and that the order of steps may be rearranged.

Referring now to FIGS. 13-16, several different embodiments for selecting a language are discussed. The discussion of FIGS. 13-16 may reference audio kit portion 628 that exists in image portions 608 and 610 and the software update processes of FIGS. 7-10. FIGS. 13A-C shows several block diagrams illustrating an out-of-the box language selection. That is, when a user initially turns on her hazard detection system, she may be prompted to choose one of several different languages. For ease of discussion, assume that the hazard detection system is preprogrammed with two different languages, but it is understood that any suitable number of languages can be programmed therein, provided sufficient NVM storage is available. FIG. 13A shows illustrative image portions 1310 and 1320, which may be similar to image portions 608 and 610 of FIG. 6A. Image portions 1310 and 1320 may include code programmed at the factory. Each of image portions 1310 and 1320 can include several subportions as described with reference to FIGS. 6A and 6B, but only the manifest portions (1312 and 1322) and audio kit portions (1314 and 1324) are shown. Manifest portions 1312 and 1322 can specify which software version is contained therein and audio kit portions 1314 and 1324 specify which audio kit is contained therein. As shown, both images are programmed with firmware version 1.0, and image portion 1310 is programmed with an English audio kit and image portion 1320 is programmed with a French audio kit.

Figure 13A:
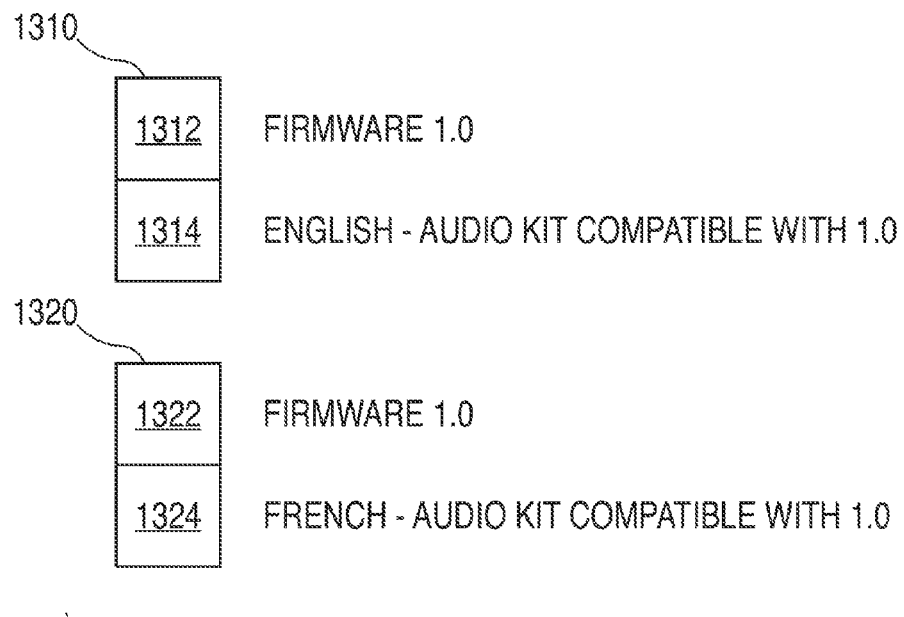
FIGS. 13A-13C show several block diagrams illustrating an out-of-the box language selection, according to an embodiment.
Figure 13B:
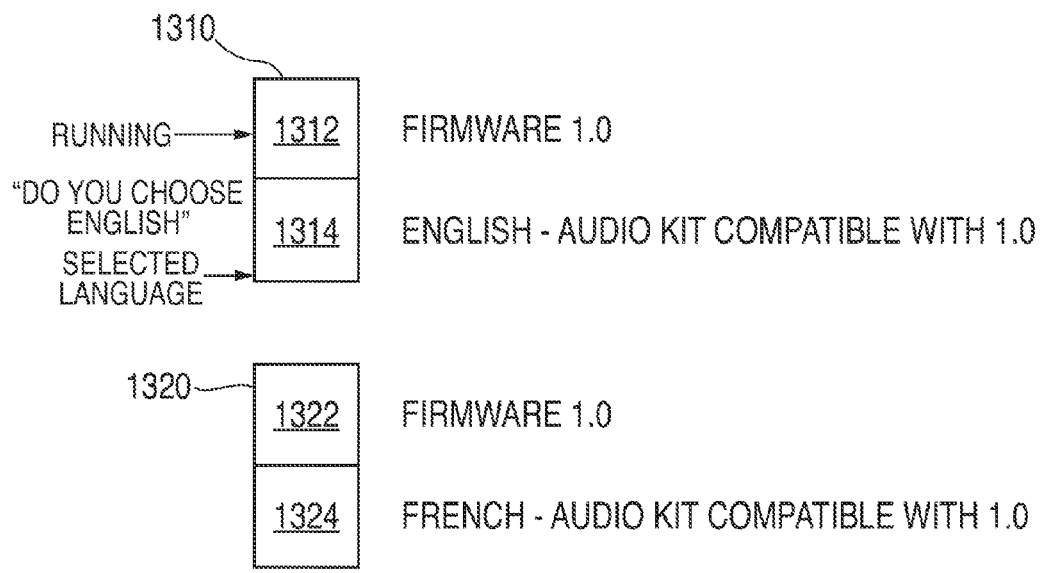
Figure 13C:
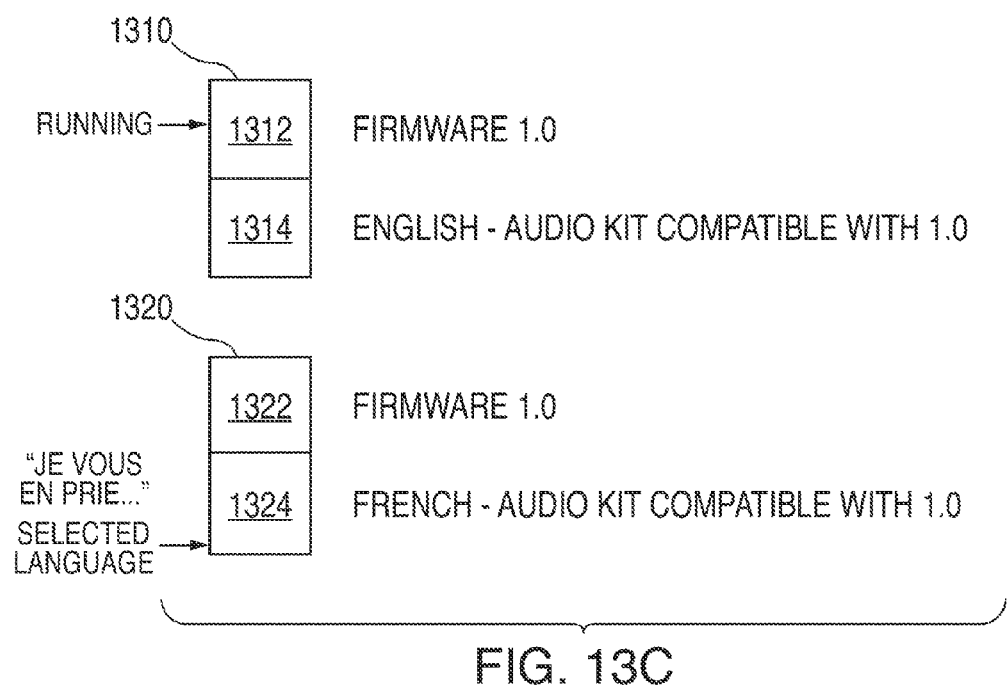

When the user turns the hazard detection system ON, it may boot from a default image, which is shown in FIG. 13B as image portion 1310. Thus, the system may be running firmware version 1.0 that uses an English audio kit. The system may prompt the user to choose whether to use the language (e.g., English) in audio kit portion 1314 as her selected language. If the user indicates YES, the system may set audio kit portion 1314 as the selected language portion. If the user indicates NO, the system may prompt the user to choose whether to use the language (e.g., French) in audio kit portion 1324 as her selected language, as illustrated in FIG. 13C. If the user indicates YES, the system may continue to run based on image 1310, but set audio kit portion 1324 as the selected language portion. This way, there is no need to reboot, but simply swap a "pointer" to the appropriate language portion. If the user indicates NO, the system may ask the user whether she wishes to select another language (not shown) or automatically select a default language if no other images are available.

Figure 14A:
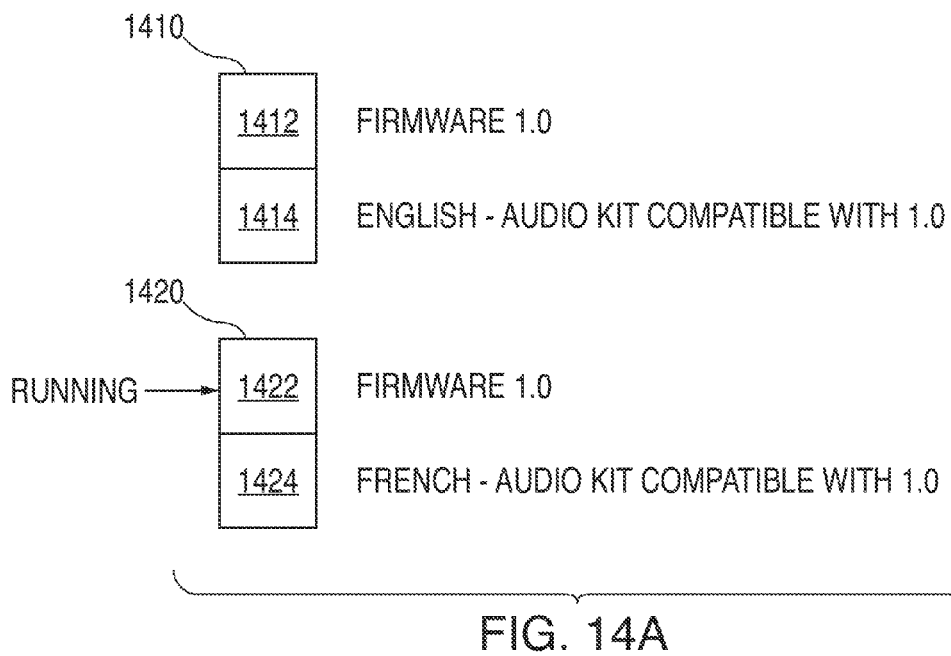
FIGS. 14A-14C show several block diagrams illustrating a language update, according to an embodiment.
Figure 14B:
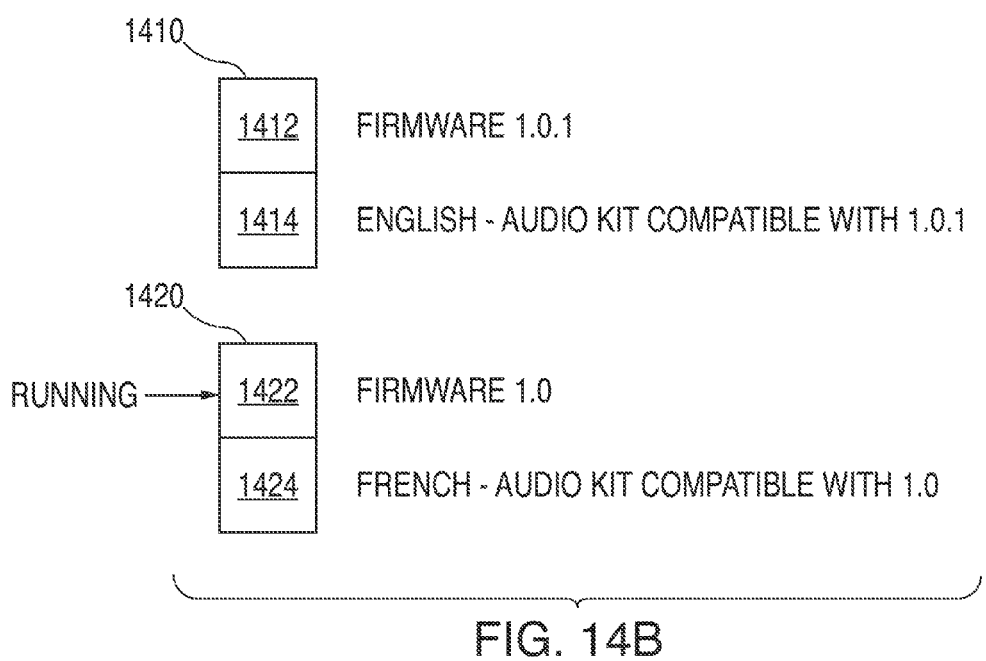
Figure 14C:
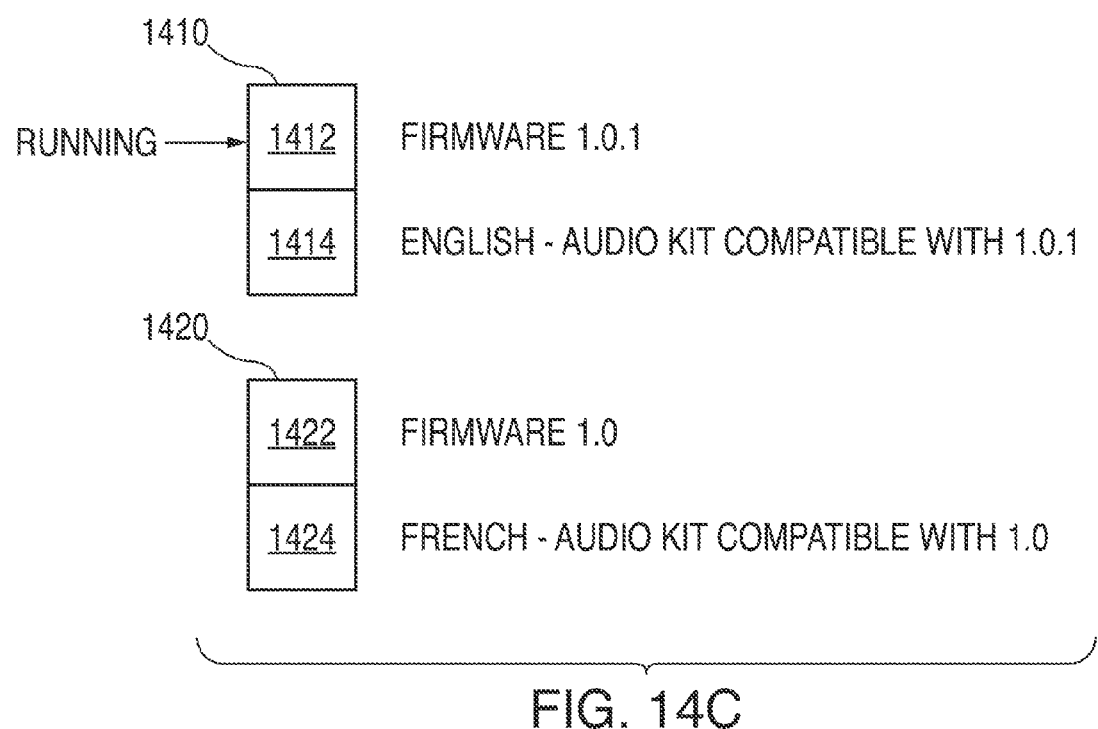

FIGS. 14A-C show several block diagrams illustrating a language update according to an embodiment. This update may, for example, be a non-user (e.g., remote server) originated software update. Beginning with FIG. 14A, a hazard detection system may be running based on code stored in image portion 1420. As such, image portion 1420 may be the "active" portion in the NVM and image portion 1410 may be the "inactive" portion. When the hazard system receives notice that a new software update is available, it may download the software update package and store it in the inactive portion (i.e., image portion 1410). This is illustrated in FIG. 14B, which shows image 1410 having contained therein firmware version 1.0.1 and a French audio kit that is compatible with firmware version 1.0.1. Note that the processor is still running based on the code stored in image 1420. However, after the processor reboots, it may boot using the code in image 1410, and run using that code. This is illustrated in FIG. 14C.

Figure 15A:
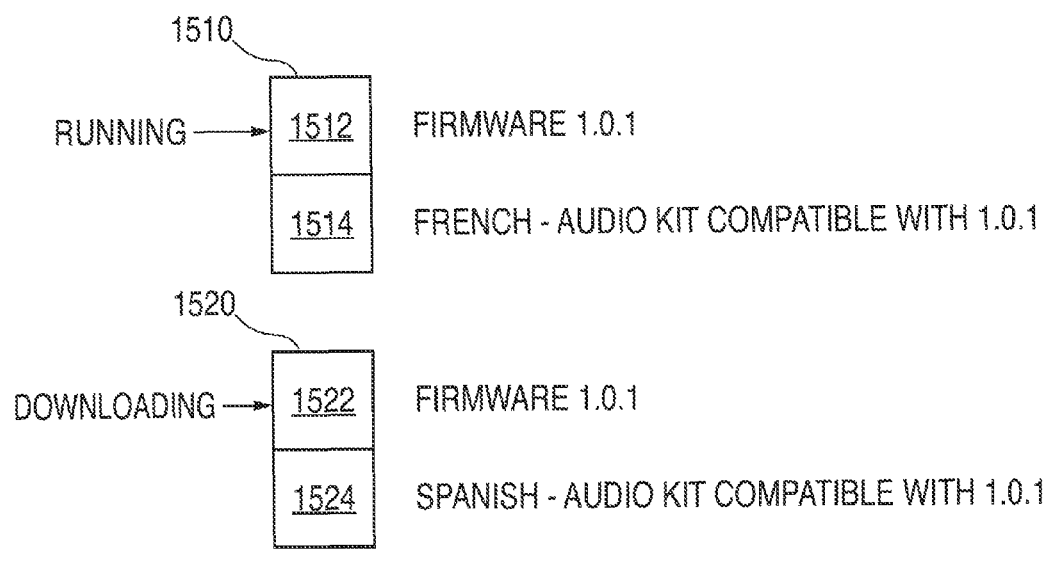
FIGS. 15A-15B show a sequence of illustrative block diagrams that may be performed by a hazard detection system when a user desires to update the language of an audio kits, according to an embodiment.
Figure 15B:
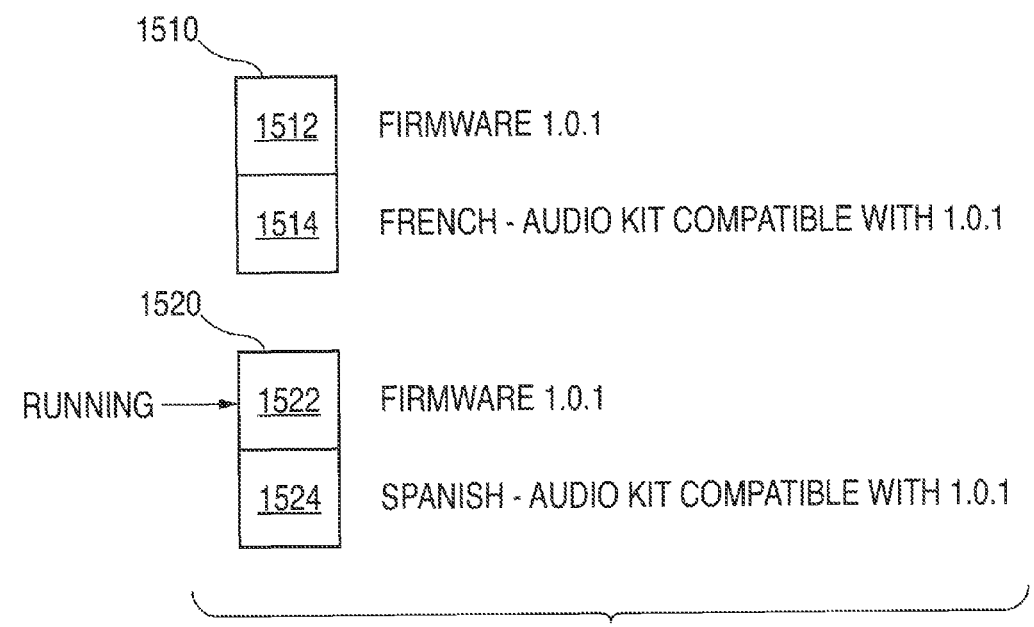

There may be instances when a user desires to change the language to a new language. The user may do this by selecting a desired language in an application or other program affiliated with an account associated with the user's hazard detection system. When the user selects the desired language, this preference may be transmitted to a remote server (e.g., a remote server that communicates with the user's devices such as her hazard detection system). When the hazard detection system checks in with the remote server to determine whether a software updated is needed, the remote server may evaluate data (e.g., manifest data) provided by the hazard system to determine whether that system requires an update. Assuming the hazard system is running firmware version 1.0.1 with the French language kit, and that the user wishes to change the language to Spanish, the remote server may provide a software update that contains the Spanish audio kit to the hazard system. Referring now to FIG. 15A, active image 1510 may include the active image 1510 that includes the running firmware version 1.0.1 with the French language kit 1514. The inactive image 1520 may store the downloaded software update which includes the same firmware version 1.0.1 but with the Spanish audio kit 1524. After the downloaded software update is verified and the processor reboots using image portion 1520, the hazard system may be running with the Spanish audio kit, as shown in FIG. 15B.

Figure 16A:
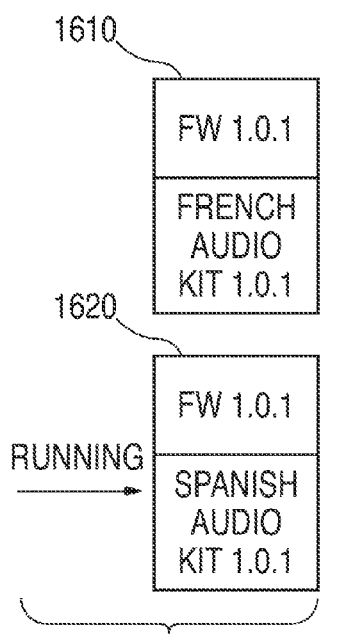
FIGS. 16A-16F show a sequence of illustrative block diagrams that show a hazard system recovering from a corrupted software update package, according to an embodiment.
Figure 16B:
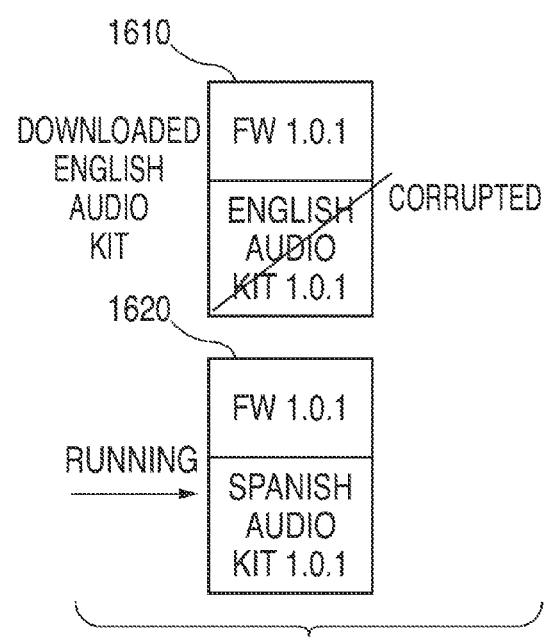
Figure 16C:
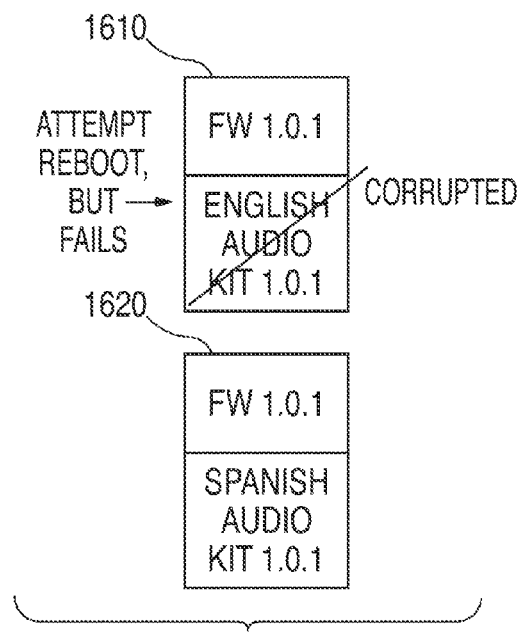
Figure 16D:
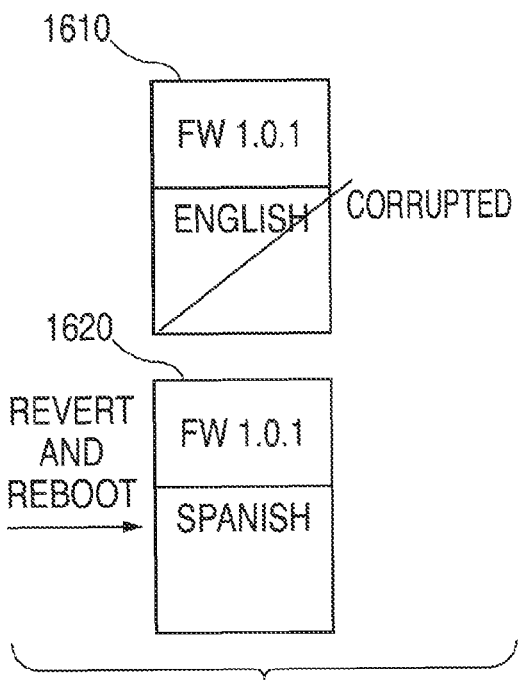
Figure 16E:
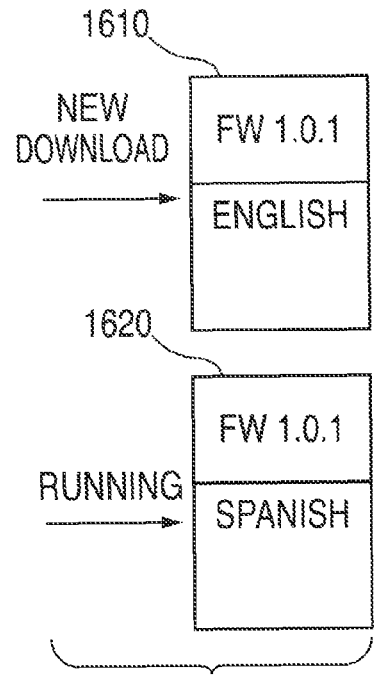
Figure 16F:
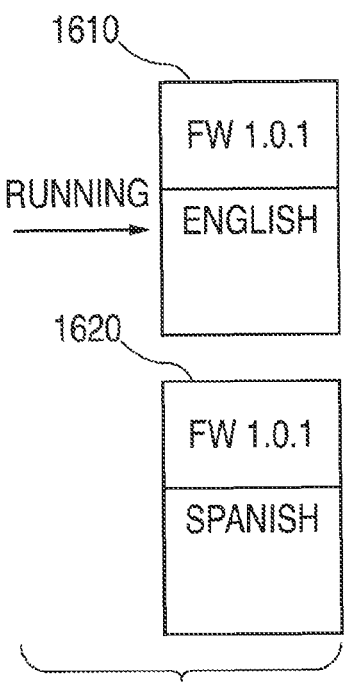

FIGS. 16A-F show a sequence of illustrative block diagrams of images 1610 and 1620 that show hazard system recovering from a corrupted software update package, according to an embodiment. FIG. 16A may represent an initial state of images 1610 and 1620, where the system processor is running code stored in image 1610. In response to a user demand to change the language to English or other language, the system may download a software update package. As shown in FIG. 16B, the English audio kit is downloaded into image 1610, which is the inactive portion. However, there was an error in the downloaded file and it is corrupted. When the system attempts to boot from the corrupted coded in image 1610, it fails, as shown in FIG. 16C. The system may revert to a previously known good code image, such as image 1620 and reboot (shown in FIG. 16D). With the system running on code contained in image 1620, the system may download another software update package in image 1610 (shown in FIG. 16E). This time, however, the package is not corrupt and the system is able to boot using code stored in image 1620 (shown in FIG. 16F). Accordingly, the system is running with the English language audio kit.

It is understood that although the software update techniques are described herein with respect to a hazard detection system, these techniques may also be used in any system or device where it is desired to maintain sensing and monitoring of other events while updating the operational capabilities of one of more components of that system or device. For example, the other events can include events that are not necessarily tied to hazards such as smoke, CO, and heat, but can include motion detection, sound detection, and the like. Events reported by remote devices may also be taken into account. For example, security device such as window and door sensor, and motion detection sensors that provide feedback to a system may quality as other events.

Any processes described with respect to FIGS. 1-16, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A hazard detection system, comprising:
at least one hazard sensor;
a non-volatile memory comprising a plurality of code images, wherein a first code image is active and a second code image is inactive; and
a plurality of processors each operative to run based on code stored in the active code image, the plurality of processors comprising at least a system processor and a safety processor, wherein the system processor is operative to:
manage a software update process to replace the inactive code image with an updated code image, and
wherein the safety processor is operative to:
monitor the at least one hazard sensor for a hazard event while the system processor is managing the software update process.

2. The hazard detection system of claim 1, wherein the system processor is operative to:
perform a system status check to determine whether to proceed with the software update process.

3. The hazard detection system of claim 2, wherein the system status check comprises status check of at least one state machine.

4. The hazard detection system of claim 2, wherein the system status check comprises power level status of a power source.

5. The hazard detection system of claim 1, wherein the system processor is operative to:
authenticate the updated code image;
proceed with the software update process if the updated code image is authenticated; and
delete the updated code image if the updated code image is not authenticated.

6. The hazard detection system of claim 1, wherein the updated code image comprises system processor code, wherein the system processor is operative to:
install the system processor code in internal memory of the system processor; and
reboot using the installed system processor code.

7. The hazard detection system of claim 6, wherein the system processor is operative to:
verify that reboot is successful; and
set the updated code image as the active code image in response to the verified successful reboot.

8. The hazard detection system of claim 6, wherein the active code image comprises active system processor code, the system processor is operative to:
determine that the reboot is unsuccessful;
install the active system processor code in the internal memory of the system processor; and
reboot using the installed active system processor code.

9. The hazard detection system of claim 6, wherein the system processor is operative to:
verify that the system processor code is successfully installed; and reboot using the installed system processor code in response to verification that the system processor code is successfully installed.

10. The hazard detection system of claim 6, wherein the active code image comprises active system processor code, the system processor is operative to:
  determine that the installation of the system processor code is unsuccessful;
  restore the active system processor code in the internal memory of the system processor; and
  reboot using the restored active system processor code.

11. The hazard detection system of claim 1, wherein the updated code image comprises safety processor code, wherein the system processor is operative to:
  notify the safety processor that the safety processor code is available for a safety processor software update;
  wherein the safety processor is operative to:
  independently determine when to upgrade its software in response to the safety processor software update notification; and
  update its software with the safety processor code in response to its independent determination.

12. The hazard detection system of claim 11, wherein the updated code image comprises first and second safety processor code portions, wherein the safety processor comprises internal non-volatile memory comprising a safety processor (SP) active code portion and a SP inactive code portion, wherein the safety processor is operative to:
  copy a selected one of the first and second processor code portions to the SP inactive code portion; and
  execute code in the SP active code portion while copying the selected code to the SP inactive code portion to monitor the at least one hazard sensor for a hazard event.

13. The hazard detection system of claim 12, wherein the safety processor is operative to:
  authenticate the selected code portion copied to the SP inactive code portion; and
  determine whether it is safe to reboot the safety processor in response to a successful authentication of the selected safety processor code portion.

14. The hazard detection system of claim 12, wherein the safety processor is operative to:
  authenticate the selected code portion copied to the SP inactive code portion; and
  mark the selected code portion as bad in response a failed authentication of the selected safety processor code portion.

15. The hazard detection system of claim 13, wherein the safety processor is operative to:
  reboot using the selected code portion copied to the SP inactive code portion;
  verify that reboot is successful; and
  set the selected code portion as the SP active code portion in response to the verified successful reboot.

16. The hazard detection system of claim 13, wherein the safety processor is operative to:
  reboot using the selected code portion copied to the SP inactive code portion;
  determine that reboot is unsuccessful;
  reboot using the code portion stored in the active code portion; and
  verify that the reboot is successful.

17. The hazard detection system of claim 15, wherein the safety processor is operative to:
  notify the system processor that the safety processor has been successfully rebooted.

18. The hazard detection system of claim 1, wherein the at least one hazard sensor comprises a smoke sensor.

19. The hazard detection system of claim 1, wherein the at least one hazard sensor comprises a carbon monoxide sensor.

20. A method for updating software in a hazard detection system comprising system and safety processors, at least one sensor, and an alarm, the method comprising:
  performing a system status check to determine whether the system processor is permitted to execute a software update process;
  executing the software update process while the system status check is satisfied;
  ceasing the executing of the software update process if the system status check is not satisfied; and
  using the safety processor to monitor the at least one sensor and to activate the alarm in response to a monitored hazard event while the software update process is executing.

21. The method of claim 20, wherein the performing a system status check comprises:
  verifying that the hazard detection system is not in an alarming state or a pre-alarming state.

22. The method of claim 20, wherein the performing a system status check comprises:
  verifying that a power source is providing power above a threshold.

23. The method of claim 20, wherein the executing the software update process comprises:
  determining whether a software update is available by accessing a remote server; and
  receiving the software update if available.

24. The method of claim 20, wherein the executing the software update process comprises:
  storing a software update image in an inactive portion of a non-volatile memory, wherein the system processor is executing code stored in an active portion of the non-volatile memory.

25. The method of claim 24, wherein the software update image comprises system processor code, wherein the executing the software update process comprises:
  installing the system processor code into a memory of the system processor;
  rebooting the system processor using the installed system processor code; and
  setting the stored software update image as the active portion of the non-volatile memory in response to a successful reboot of the system processing using the installed system processor code.

26. The method of claim 24, wherein the software update image comprises code portions for each of the system processor and the safety processor.

27. The method of claim 26, wherein the software update image comprises at least one other code portion for at least one other processor.

28. The method of claim 24, wherein the software update image comprises code for an audio kit, wherein the system processor accesses the audio kit to playback media via a speaker.

29. The method of claim 24, wherein the software update image comprises safety processor code, wherein the executing the software update process comprises:
  selectively updating the safety processor, wherein the safety processor independently determines when to update its software.

30. The method of claim 29, wherein the safety processor comprises internal memory comprising a safety processor (SP) active portion and a SP inactive portion, wherein the safety processor is executing code stored in the SP active portion, where the selectively updating comprises:

storing the safety processor code in the SP inactive portion;

determining if it is safe to reboot;

rebooting the safety processor using the safety processor code stored in the SP inactive portion when it is determined safe to reboot, wherein the monitoring is suspended during the rebooting; and setting the SP inactive portion as the SP active portion in response to a successful reboot of the safety processor.

31. A method for updating software in a home system comprising first and second processors, at least one sensor, and an alarm, the method comprising:

performing a system status check to determine whether the first processor is permitted to execute a software update process;

executing the software update process while the system status check is satisfied;

ceasing the executing of the software update process if the system status check is not satisfied; and using the second processor to monitor the at least one sensor and to activate the alarm in response to a monitored event while the software update process is executing.

32. The method of claim 31, further comprising wireless communications circuitry for receiving wireless communications from at least one other device, wherein the performing the system status check comprising determining whether any wireless communications have been received.

33. The method of claim 31, wherein performing the system status check comprises verifying monitored environmental conditions satisfy system check criteria.

34. The method of claim 33, wherein monitored environmental conditions comprise sound, light, smoke, carbon monoxide, and heat.

35. The method of claim 31, wherein performing the system status check comprises verifying monitored security conditions satisfy system check criteria.

36. The method of claim 35, wherein monitored security conditions comprise data received from at least one sensor that is located remote from the home system.

* * * * *